US012538077B2

(12) United States Patent
Han et al.

(10) Patent No.: US 12,538,077 B2
(45) Date of Patent: Jan. 27, 2026

(54) ULTRASONIC TRANSDUCER, FABRICATION METHOD THEREOF AND ELECTRONIC DEVICE

(71) Applicant: BOE Technology Group Co., Ltd., Beijing (CN)

(72) Inventors: Yanling Han, Beijing (CN); Wenqu Liu, Beijing (CN); Qi Yao, Beijing (CN); Lei Wang, Beijing (CN); Hua Huang, Beijing (CN); Zhuo Li, Beijing (CN); Yonggang Cao, Beijing (CN); Yue Gou, Beijing (CN); Yaqian Ji, Beijing (CN); Qianyan Li, Beijing (CN); Yingzi Wang, Beijing (CN)

(73) Assignee: BOE Technology Group Co., Ltd., Beijing (CN)

( * ) Notice: Subject to any disclaimer, the term of this patent is extended or adjusted under 35 U.S.C. 154(b) by 148 days.

(21) Appl. No.: 18/021,544

(22) PCT Filed: May 27, 2022

(86) PCT No.: PCT/CN2022/095709

§ 371 (c)(1),
(2) Date: Feb. 15, 2023

(87) PCT Pub. No.: WO2023/226021

PCT Pub. Date: Nov. 30, 2023

(65) Prior Publication Data

US 2024/0267680 A1 Aug. 8, 2024

(51) Int. Cl.
*H04R 7/10* (2006.01)
*H04R 31/00* (2006.01)

(52) U.S. Cl.
CPC ............ *H04R 7/10* (2013.01); *H04R 31/003* (2013.01)

(58) Field of Classification Search
CPC ................................ H04R 7/10; H04R 31/003
(Continued)

(56) References Cited

U.S. PATENT DOCUMENTS

2008/0181437 A1* 7/2008 Suzuki ................ H04R 19/016 381/191
2008/0259725 A1 10/2008 Bayram et al.
(Continued)

FOREIGN PATENT DOCUMENTS

CN 102498586 B 11/2013
CN 102333485 B 12/2014
(Continued)

*Primary Examiner* — Suhan Ni
(74) *Attorney, Agent, or Firm* — IPro, PLLC

(57) ABSTRACT

Provides are an ultrasonic transducer, a fabrication method thereof and an electronic device. The ultrasonic transducer includes: an array substrate having a groove, a bottom electrode and an insulation layer, wherein an orthographic projection of the groove on the array substrate is within an orthographic projection of the bottom electrode on the array substrate, and the insulation layer covers the bottom electrode; and an opposite substrate, the opposite substrate and the array substrate are oppositely arranged and are attached to each other, the opposite substrate and the array substrate form a cavity in the groove, the opposite substrate has a top electrode and a vibrating diaphragm layer which are arranged in stack, and an orthographic projection of the top electrode on the array substrate is within the orthographic projection of the bottom electrode on the array substrate.

20 Claims, 26 Drawing Sheets

(58) Field of Classification Search
USPC .......................................... 381/175, 191, 426
See application file for complete search history.

(56) References Cited

U.S. PATENT DOCUMENTS

| | | | |
|---|---|---|---|
| 2011/0068654 | A1 | 3/2011 | Cheng et al. |
| 2012/0010538 | A1 | 1/2012 | Dirksen |

FOREIGN PATENT DOCUMENTS

| | | | |
|---|---|---|---|
| CN | 105540528 | A | 5/2016 |
| CN | 105578368 | A | 5/2016 |
| CN | 110057907 | A | 7/2019 |
| CN | 110773408 | A | 2/2020 |

* cited by examiner

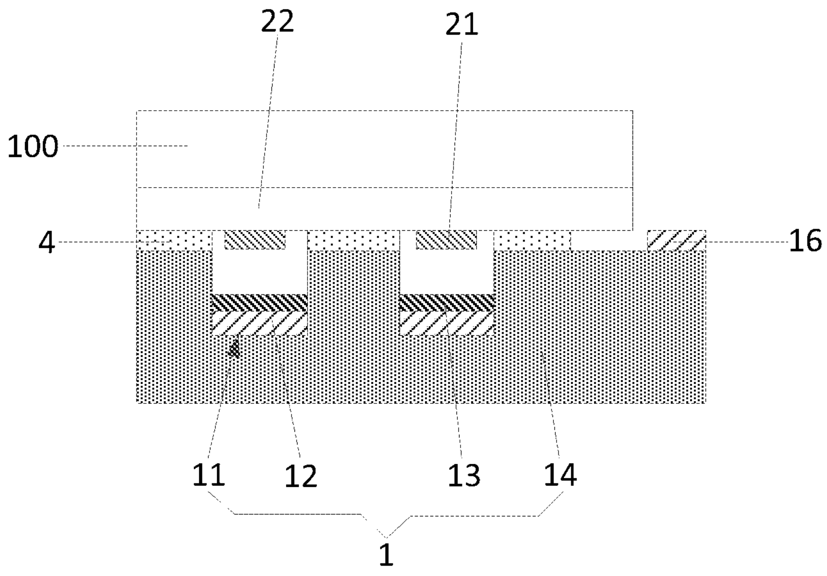
Fig. 32E
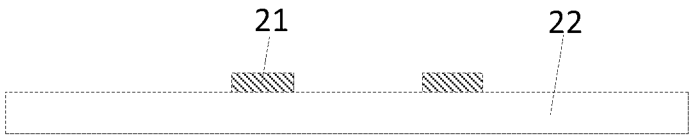
Fig. 32D’

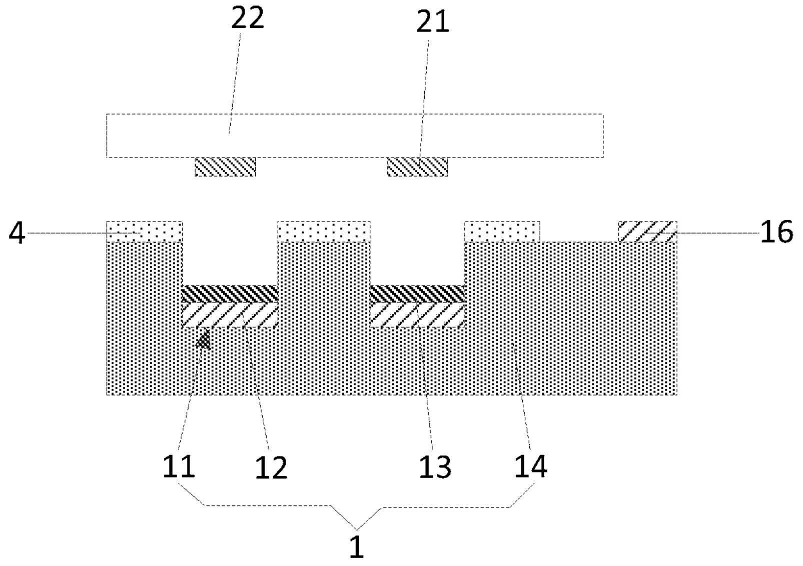
Fig. 32E’

ULTRASONIC TRANSDUCER, FABRICATION METHOD THEREOF AND ELECTRONIC DEVICE

CROSS-REFERENCE TO RELATED APPLICATIONS

This application is a National Stage of International Application No. PCT/CN2022/095709, filed May 27, 2022, which is hereby incorporated by reference in its entirety.

FIELD

The present disclosure relates to the technical field of ultrasonic transduction, in particular to an ultrasonic transducer, a fabrication method thereof and an electronic device.

BACKGROUND

Main functions of an ultrasonic transducer are that in an emitting stage, the transducer converts input electric energy into mechanical energy under an action of an excitation signal to transmit it out so as to implement emission of ultrasonic waves; and in a receiving stage, the transducer converts a sound wave into an electrical signal so as to implement receiving of the ultrasonic waves.

A capacitive micromachined ultrasonic transducer (CMUT) is an ultrasonic transducer which has developed most fast in recent years and has the advantages of being simple in structure, small in size, flexible in design, high in sensitivity and the like.

SUMMARY

Embodiments of the present disclosure provide an ultrasonic transducer, a fabrication method thereof and an electronic device. A specific solution is as follows.

An ultrasonic transducer provided by an embodiment of the present disclosure includes: an array substrate, having a groove, a bottom electrode and an insulation layer, wherein an orthographic projection of the groove on the array substrate is located within a range of an orthographic projection of the bottom electrode on the array substrate, and the insulation layer covers the bottom electrode; and an opposite substrate, wherein the opposite substrate and the array substrate are oppositely arranged and are attached to each other, the opposite substrate and the array substrate form a cavity in the groove, the opposite substrate has a top electrode and a vibrating diaphragm layer which are arranged in stack, and an orthographic projection of the top electrode on the array substrate is located within the range of the orthographic projection of the bottom electrode on the array substrate.

In the above ultrasonic transducer provided by some embodiments of the present disclosure, the top electrode is located on a side of the vibrating diaphragm layer back on to the array substrate, or the top electrode is located on a side of the vibrating diaphragm layer facing the array substrate.

In the above ultrasonic transducer provided by some embodiments of the present disclosure, a material of the vibrating diaphragm layer is glass, PI or PET.

In the above ultrasonic transducer provided by some embodiments of the present disclosure, the array substrate further includes a base substrate, the base substrate has the groove, the bottom electrode is located at a bottom of the groove, the insulation layer is located on a side of the bottom electrode facing the opposite substrate, and a depth of the groove is greater than a sum of thicknesses of the bottom electrode and the insulation layer.

In the above ultrasonic transducer provided by some embodiments of the present disclosure, a material of the base substrate is glass.

In the above ultrasonic transducer provided by some embodiments of the present disclosure, the material of the vibrating diaphragm layer is PI or PET, and the vibrating diaphragm layer and the base substrate are fixedly attached through a first adhesive layer.

In the above ultrasonic transducer provided by some embodiments of the present disclosure, the material of the vibrating diaphragm layer is glass, the vibrating diaphragm layer and the base substrate are fixedly attached through a first adhesive layer, or the vibrating diaphragm layer and the base substrate are fixedly attached through a bonding technology.

In the above ultrasonic transducer provided by some embodiments of the present disclosure, the array substrate further includes: a base substrate, the bottom electrode located on the base substrate, the insulation layer located on a side of the bottom electrode facing away from the base substrate, and a retaining wall structure located on a side of the insulation layer facing away from the base substrate, wherein the retaining wall structure has the groove, and the groove penetrates through the retaining wall structure in a thickness direction of the retaining wall structure.

In the above ultrasonic transducer provided by some embodiments of the present disclosure, a material of the base substrate is glass, and a material of the retaining wall structure includes one of glass, sealant, hydrogel or resin.

In the above ultrasonic transducer provided by some embodiments of the present disclosure, a material of the vibrating diaphragm layer is glass, the material of the retaining wall structure is glass, the vibrating diaphragm layer and the retaining wall structure are fixedly attached through a first adhesive layer, or the vibrating diaphragm layer and the retaining wall structure are fixedly attached through a bonding technology.

In the above ultrasonic transducer provided by some embodiments of the present disclosure, a material of the vibrating diaphragm layer is PI or PET, the material of the retaining wall structure is glass, sealant, hydrogel or resin, and the vibrating diaphragm layer and the retaining wall structure are fixedly attached through a first adhesive layer.

In the above ultrasonic transducer provided by some embodiments of the present disclosure, a size of the top electrode is smaller than or equal to a size of the bottom electrode.

In the above ultrasonic transducer provided by some embodiments of the present disclosure, the size of the top electrode is 0.5-1 time the size of the bottom electrode.

In the above ultrasonic transducer provided by some embodiments of the present disclosure, a shape of the groove includes circle, square and polygon.

In the above ultrasonic transducer provided by some embodiments of the present disclosure, the array substrate includes a device region and a surrounding region arranged surrounding the device region, a plurality of grooves are distributed in an array, the plurality of grooves are located in the device region, the bottom electrodes are in one-to-one correspondence with the grooves, and the top electrodes are in one-to-one correspondence with the bottom electrodes, any two adjacent top electrodes are mutually electrically connected; and the plurality of bottom electrodes are divided into a plurality of regions, any two adjacent bottom electrodes in the same region are mutually electrically connected, and any two adjacent bottom electrodes in the different regions are mutually insulated.

In the above ultrasonic transducer provided by some embodiments of the present disclosure, all the bottom electrodes in the same column are mutually electrically connected, and the bottom electrodes in different columns are mutually independent; or, the plurality of bottom electrodes are divided into a plurality of blocky regions, all the bottom electrodes located in the same blocky region are mutually electrically connected, and the bottom electrodes located in the different blocky regions are mutually independent; or, the plurality of bottom electrodes are divided into a middle region and a peripheral region surrounding the middle region, all the bottom electrodes in the middle region are mutually electrically connected, all the bottom electrodes in the peripheral region are mutually electrically connected, and the bottom electrodes in the middle region are independent of the bottom electrodes in the peripheral region.

In the above ultrasonic transducer provided by some embodiments of the present disclosure, the array substrate further includes first leads electrically connected with the bottom electrodes; the first leads are led out from side walls of the grooves and extend to a first binding region of the surrounding region; or, in positions of the base substrate corresponding to the bottom electrodes, the base substrate has via holes penetrating through the base substrate in a thickness direction of the base substrate, and the first leads are led out from the via holes and extend to the first binding region.

In the above ultrasonic transducer provided by some embodiments of the present disclosure, the array substrate further includes: a first connecting electrode located in the surrounding region and arranged on the same layer as the bottom electrodes, and a second lead electrically connected with the first connecting electrode; and the opposite substrate further includes a second connecting electrode located in the surrounding region, arranged on the same layer as the top electrodes and electrically connected with the top electrodes, the top electrodes are electrically connected with the first connecting electrode through the second connecting electrode, and the second lead is led out and extends to the first binding region.

In the above ultrasonic transducer provided by some embodiments of the present disclosure, the opposite substrate includes a third lead electrically connected with the top electrodes, and the third lead extends to a second binding region of the opposite substrate; the first binding region and the second binding region are located on opposite sides of the device region; or, the first binding region and the second binding region are located on the same side of the device region, and an orthographic projection of the second binding region is located between an orthographic projection of the device region and an orthographic projection of the first binding region.

Correspondingly, an embodiment of the present disclosure further provides an electronic device, including: any above ultrasonic transducer provided by the embodiments of the present disclosure.

Correspondingly, an embodiment of the present disclosure further provides a fabrication method of an ultrasonic transducer, including: fabricating an array substrate, wherein the array substrate has a groove, a bottom electrode and an insulation layer, an orthographic projection of the groove on the array substrate is located within a range of an orthographic projection of the bottom electrode on the array substrate, and the insulation layer covers the bottom electrode; fabricating an opposite substrate, wherein the opposite substrate has a top electrode and a vibrating diaphragm layer which are arranged in stack; and attaching the array substrate to the opposite substrate, wherein an orthographic projection of the top electrode on the array substrate is located within a range of an orthographic projection of the bottom electrode on a base substrate, and the opposite substrate and the array substrate form a cavity in the groove.

In the above fabrication method provided by embodiment of the present disclosure, the fabricating an array substrate specifically includes: providing and etching a base substrate to form the groove; forming the bottom electrode at a bottom of the groove; and forming the insulation layer on a side of the bottom electrode facing away from the bottom of the groove.

In the above fabrication method provided by embodiments of the present disclosure, the fabricating an array substrate specifically includes: providing a base substrate; forming the bottom electrode on the base substrate; forming the insulation layer on a side of the bottom electrode facing away from the base substrate; and forming a retaining wall structure on a side of the insulation layer facing away from the base substrate, wherein the retaining wall structure has the groove which penetrates through the retaining wall structure in a thickness direction of the retaining wall structure.

In the above fabrication method provided by embodiments of the present disclosure, the fabricating an opposite substrate specifically includes: providing a glass substrate; forming the vibrating diaphragm layer on the glass substrate, wherein a material of the vibrating diaphragm layer is PI or PET; forming the top electrode on the vibrating diaphragm layer; and stripping off the glass substrate before attaching the array substrate to the opposite substrate, or stripping off the glass substrate after attaching the array substrate to the opposite substrate.

BRIEF DESCRIPTION OF THE DRAWINGS

FIG. 32E is a schematic sectional view of the fifth fabricating step of an opposite substrate.

FIG. 32D' is a schematic sectional view of the first fabricating step of an ultrasonic transducer.

FIG. 32E' is a schematic sectional view of the second fabricating step of an ultrasonic transducer.

DETAILED DESCRIPTION OF THE EMBODIMENTS

Figure 1:
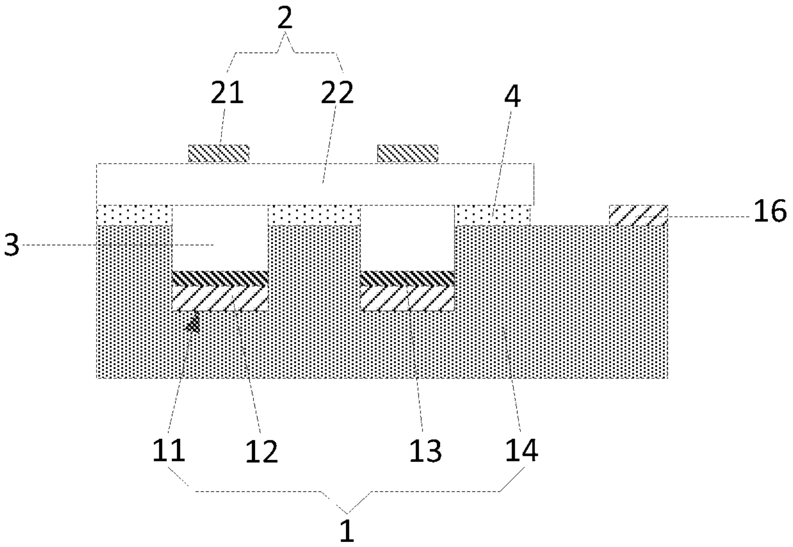
FIG. 1 is a schematic structural diagram of the first type of ultrasonic transducers provided by an embodiment of the present disclosure.

In order to make objectives, technical solutions and advantages of embodiments of the present disclosure clearer, the technical solutions of the embodiments of the present disclosure will be clearly and fully described below with reference to the accompanying drawings of the embodiments of the present disclosure. Apparently, the described embodiments are only some, but not all of the embodiments of the present disclosure. The embodiments in the present disclosure and features in the embodiments may be mutually combined without conflicts. Based on the described embodiments of the present disclosure, all other embodiments obtained by those ordinarily skilled in the art without creative work fall within the protection scope of the present disclosure.

Unless otherwise defined, technical or scientific terms used by the present disclosure should be understood commonly by those ordinarily skilled in the art to which the present disclosure pertains. “Include” or “contain” or similar words used in the present disclosure mean that a component or an item preceding the word covers components or items and their equivalents listed after the word without excluding other components or items. “Connection”, “connected” and similar words may include electrical connection, direct or indirect, instead of being limited to physical or mechanical connection. “Inner”, “outer”, “upper”, “lower” and the like are only used for denoting a relative position relation, and when an absolute position of a described object changes, the relative position relation may also change correspondingly.

It needs to be noted that sizes and shapes of all figures in the accompanying drawings do not reflect a true scale and are only intended to illustrate contents of the present disclosure. The same or similar reference numbers denote the same or similar components or components with the same or similar functions all the time.

In the related art, a fabrication method of a glass-based CMUT usually adopts a sacrificial layer solution, a technological process is complicated, time of etching a sacrificial layer to form a cavity is long, and incomplete etching and residues are prone to occurring. Especially, specific to application of the CMUT to low frequency ultrasound such as directional sound, large-size array elements and thick films are needed to reduce a frequency, but a thickness is limited by a traditional solution for depositing each film layer of the CMUT, and a vibrating diaphragm is prone to collapsing.

In view of this, an embodiment of the present disclosure provides an ultrasonic transducer, as shown in FIG. 1 to FIG. 13. FIG. 1 to FIG. 12 are schematic sectional views of several types of ultrasonic transducers. FIG. 13 is a schematic plan view of part of film layers. The ultrasonic transducer includes:

an array substrate 1 having a groove 11, a bottom electrode 12 and an insulation layer 13, wherein an orthographic projection of the groove 11 on the array substrate 1 is located within a range of an orthographic projection of the bottom electrode 12 on the array substrate 1, and the insulation layer 13 covers the bottom electrode 12; and an opposite substrate 2, wherein the opposite substrate 2 and the array substrate 1 are oppositely arranged and are attached to each other, the opposite substrate 2 and the array substrate 1 form a cavity 3 in the groove 11, the opposite substrate 2 has a top electrode 21 and a vibrating diaphragm layer 22 which are arranged in stack, and an orthographic projection of the top electrode 21 on the array substrate 1 is located within the range of the orthographic projection of the bottom electrode 12 on the array substrate 1.

In the above ultrasonic transducer (CMUT) provided by embodiments of the present disclosure, as the array substrate and the opposite substrate which are oppositely arranged and are attached to each other are included, the array substrate and the opposite substrate may be fabricated respectively, then the array substrate and the opposite substrate are aligned and attached, and thus the CMUT of the embodiment of the present disclosure is formed. Compared with a sacrificial layer solution for fabricating the CMUT in the related art, the embodiment of the present disclosure provides a solution for fabricating the CMUT by separate fabrication and then attachment, which can meet design demands of applications of ultrasonic transducers in different frequency bands. Besides, the array substrate and the opposite substrate are fabricated respectively in the present disclosure, and a thickness of the vibrating diaphragm layer and a radius size of the cavity are conveniently adjusted, so as to meet different application demands. Besides, a process for fabricating the CMUT provided by the embodiment of the present disclosure is simple and high in productivity, meanwhile guarantees performance of the CMUT, and can greatly shorten time of forming the cavity of the CMUT, so as to improve preparation efficiency of the CMUT.

Optionally, as shown in FIG. 1 to FIG. 12, a capacitive structure is formed between the bottom electrode 12 and the top electrode 21, the top electrode 21 is located on an upper surface or a lower surface of the vibrating diaphragm layer 22, and under an action of a sound wave, the top electrode 21 may deform with vibration of the vibrating diaphragm layer 22, which leads to change in an electric quantity on the capacitive structure, so as to implement converting mechanical energy into electric energy. On the contrary, under an action of an excitation signal, input electric energy may also be converted into mechanical energy to be transmitted out.

In the above ultrasonic transducer provided by embodiments of the present disclosure, as shown in FIG. 1, FIG. 3, FIG. 5, FIG. 7, FIG. 9 and FIG. 11, the top electrode 21 may be located on a side of the vibrating diaphragm layer 22 back on to the array substrate 1; and as shown in FIG. 2, FIG. 4, FIG. 6, FIG. 8, FIG. 10 and FIG. 12, the top electrode 21 may also be located on a side of the vibrating diaphragm layer 22 facing the array substrate 1.

In the above ultrasonic transducer provided by embodiments of the present disclosure, as shown in FIG. 1 to FIG. 12, a material of the vibrating diaphragm layer 22 may be glass; and as shown in FIG. 1, FIG. 2, FIG. 5, FIG. 6, FIG. 9 and FIG. 10, the material of the vibrating diaphragm layer 22 may be PI (Polyimide) or PET (Polyethylene Terephthalate).

In the above ultrasonic transducer provided by embodiments of the present disclosure, as shown in FIG. 1 to FIG. 8, the array substrate 1 further includes a base substrate 14, the base substrate 14 has the groove 11, the bottom electrode 12 is located at a bottom of the groove 11, the insulation layer 13 is located on a side of the base substrate 12 facing the opposite substrate 2, a depth of the groove 11 is greater than a sum of thicknesses of the bottom electrode 12 and the insulation layer 13, and thus, when the base substrate 14 and the vibrating diaphragm layer 22 are aligned and attached subsequently, it can be guaranteed that the cavity 3 is formed.

In the above ultrasonic transducer provided by embodiments of the present disclosure, as shown in FIG. 1 to FIG. 8, a material of the base substrate 14 may be glass but is not limited to this.

It needs to be noted that the embodiment of the present disclosure takes the material of the base substrate 14 being glass as an example.

In the above ultrasonic transducer provided by embodiments of the present disclosure, as shown in FIG. 1, FIG. 2, FIG. 5 and FIG. 6, the material of the vibrating diaphragm layer 22 may be PI or PET, and the vibrating diaphragm layer 22 and the base substrate 14 may be fixedly attached through a first adhesive layer 4.

In the above ultrasonic transducer provided by embodiments of the present disclosure, as shown in FIG. 1 to FIG. 8, the material of the vibrating diaphragm layer 22 may be glass, optionally, as shown in FIG. 1, FIG. 2, FIG. 5 and FIG. 6, the vibrating diaphragm layer 22 of the glass material and the base substrate 14 of the glass material may be fixedly attached through the first adhesive layer 4. As shown in FIG. 3, FIG. 4, FIG. 7 and FIG. 8, the vibrating diaphragm layer 22 of the glass material and the base substrate 14 of the glass material may also be fixedly attached through a bonding technology, and a joint adhesive may be omitted.

Optionally, when the vibrating diaphragm layer of the glass material and the base substrate of the glass material are attached, a glass bonding solution may be adopted, after fabrication of the base substrate, the groove, the bottom electrode and the insulation layer of the array substrate is completed, the vibrating diaphragm layer of the glass material and the base substrate of the glass material are subjected to low-temperature bonding so as to implement a physical connection, and an airtight cavity is formed, for example, glass may be molten and bonded at a temperature of about 400° C.

In the above ultrasonic transducer provided by embodiments of the present disclosure, as shown in FIG. 9 to FIG. 12, the array substrate 1 further includes: the base substrate 14, the bottom electrode 12 located on the base substrate 14, the insulation layer 13 located on a side of the bottom electrode 12 facing away from the base substrate 14, and a retaining wall structure 15 located on a side of the insulation layer 13 facing away from the base substrate 14, wherein the retaining wall structure 15 has the groove 11, and the groove 11 penetrates through the retaining wall structure 15 in a thickness direction of the retaining wall structure 15.

In the above ultrasonic transducer provided by embodiments of the present disclosure, as shown in FIG. 9 to FIG. 12, the material of the base substrate 14 may be glass, and a material of the retaining wall structure 15 includes but is not limited to one of glass, sealant, hydrogel or resin.

Figure 9:
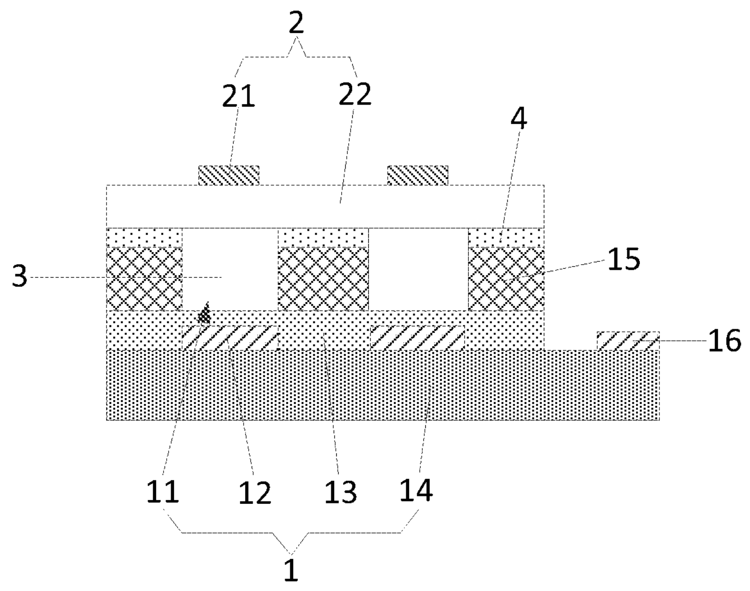
FIG. 9 is a schematic structural diagram of the ninth type of ultrasonic transducers provided by an embodiment of the present disclosure.
Figure 10:
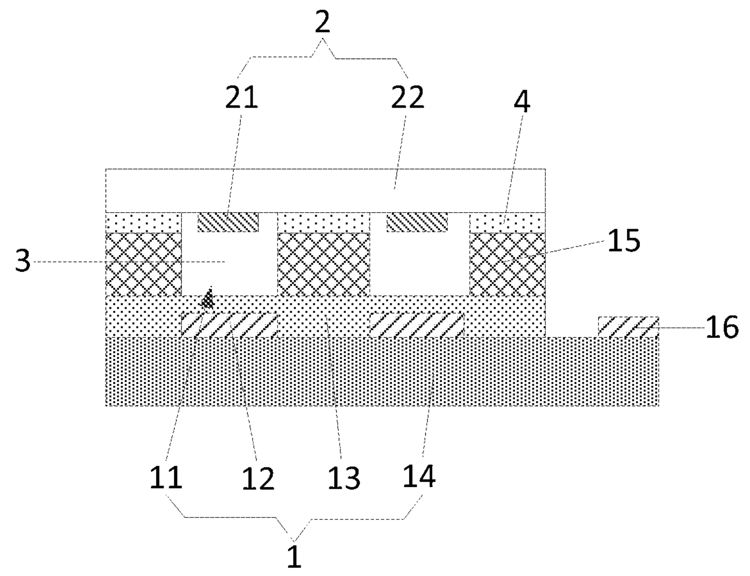
FIG. 10 is a schematic structural diagram of the tenth type of ultrasonic transducers provided by an embodiment of the present disclosure.
Figure 11:
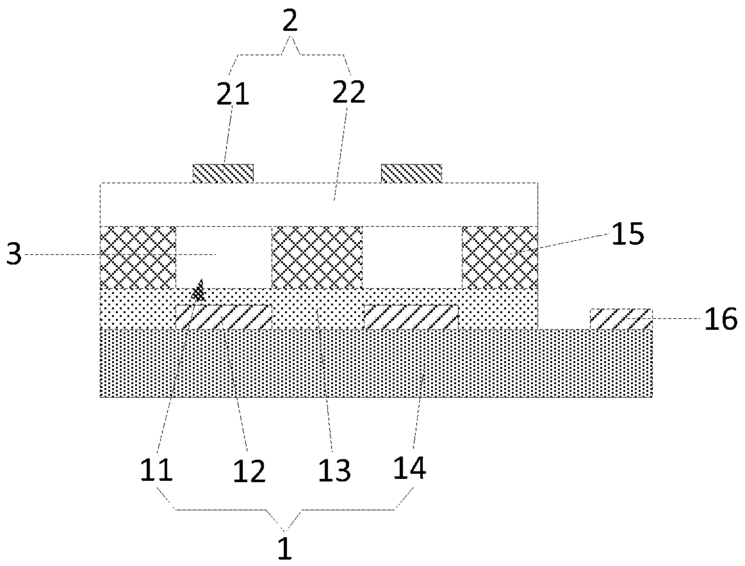
FIG. 11 is a schematic structural diagram of the eleventh type of ultrasonic transducers provided by an embodiment of the present disclosure.
Figure 12:
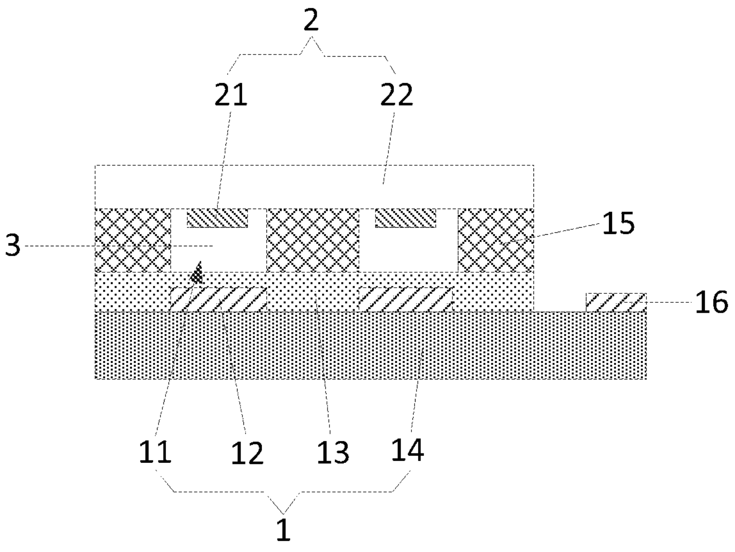
FIG. 12 is a schematic structural diagram of the twelfth type of ultrasonic transducers provided by an embodiment of the present disclosure.
Figure 13:
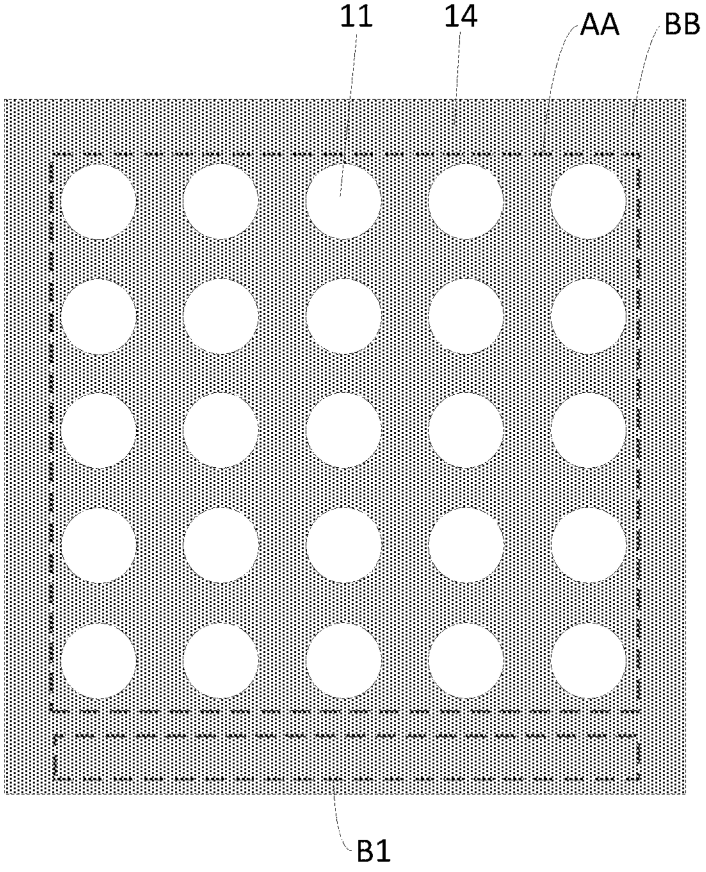
FIG. 13 is a schematic plan view of part of film layers of an ultrasonic transducer provided by an embodiment of the present disclosure.

In the above ultrasonic transducer provided by embodiments of the present disclosure, as shown in FIG. 9 to FIG. 12, the material of the vibrating diaphragm layer 22 is glass, and the material of the retaining wall structure 15 is glass. Optionally, as shown in FIG. 9 and FIG. 10, the vibrating diaphragm layer 22 of the glass material and the retaining wall structure 15 of the glass material may be fixedly attached through a first adhesive layer 4. As shown in FIG. 11 and FIG. 12, the vibrating diaphragm layer 22 of the glass material and the retaining wall structure 15 of the glass material may also be fixedly attached through a bonding technology, and a joint adhesive may be omitted.

Optionally, when the vibrating diaphragm layer of the glass material and the retaining wall structure of the glass material are attached, a glass bonding solution may be adopted, after fabrication of the base substrate, the bottom electrode, the insulation layer, the retaining wall structure and the groove of the array substrate is completed, the vibrating diaphragm layer of the glass material and the retaining wall structure of the glass material are subjected to low-temperature bonding so as to implement a physical connection, and an airtight cavity is formed, for example, glass may be molten and bonded at a temperature of about 400° C.

In the above ultrasonic transducer provided by embodiments of the present disclosure, as shown in FIG. 9 and FIG. 10, the material of the vibrating diaphragm layer 22 is PI or PET, the material of the retaining wall structure 15 may be but is not limited to glass, sealant, hydrogel or resin, and the vibrating diaphragm layer 22 and the retaining wall structure 15 may be fixedly attached through the first adhesive layer 4.

Optionally, the above first adhesive layer 4 may be an adhesive or other glue layer materials.

In the above ultrasonic transducer provided by embodiments of the present disclosure, a thickness of the vibrating diaphragm layer of the glass material is 20 μm to 200 μm, a radius of the vibrating diaphragm layer is 1000 μm to 4000 μm, and a height of the cavity is 0.5 μm to 10 μm. Optionally, the vibrating diaphragm layer of the glass material may be UTG (Ultra-Thin) glass with a thickness being 30 μm to 100 μm, and may also be a vibrating diaphragm layer formed by gluing a piece of glass with a thickness being 500 μm or 700 μm and thinning the glass to a target thickness, and a target thickness of the vibrating diaphragm layer may be 20 μm to 200 μm. Certainly, each numerical value may be adjusted with reference to a process capability during actual fabrication.

In the above ultrasonic transducer provided by embodiments of the present disclosure, the thickness of the vibrating diaphragm layer of the PI or PET material is 5 μm to 20 μm, the radius of the vibrating diaphragm layer is 500 μm to 2000 μm, and the height of the cavity is 20 μm to 80 μm. Certainly, each numerical value may be adjusted with reference to the process capability during actual fabrication.

In the above ultrasonic transducer provided by embodiments of the present disclosure, as shown in FIG. 1 to FIG. 12, a size of the top electrode 21 is smaller than or equal to a size of the bottom electrode 12. In this way, vibration of the vibrating diaphragm layer 22 is facilitated, and performance of the ultrasonic transducer may be improved. Optionally, the size of the top electrode 21 may be 0.5-1 time the size of the bottom electrode 12, for example, the size of the top electrode 21 may be 0.7 time the size of the bottom electrode 12, and the size of the top electrode 21 and the size of the bottom electrode 12 are selected and designed according to actual conditions.

During specific implementation, the materials of the bottom electrode and the top electrode may be but are not limited to Mo, Al, TiAlTi, MoAlMo and other materials, the thicknesses of the bottom electrode and the top electrode may be 0.1 μm to 0.6 μm, and some embodiments of the present disclosure takes 0.2 μm as an example. The material of the insulation layer may be but is not limited to a SiNx material, the thickness of the insulation layer may be 0.1 μm to 1.0 μm, and some embodiments of the present disclosure takes 0.2 μm as an example.

In the above ultrasonic transducer provided by embodiments of the present disclosure, as shown in FIG. 13, FIG. 13 is a schematic plan view of a groove 11 and a base substrate 14, and a shape of the groove 11 may be circle. Certainly, during specific implementation, the shape of the groove 11 may also be square, polygon or other shapes, which are not listed one by one.

Figure 14:
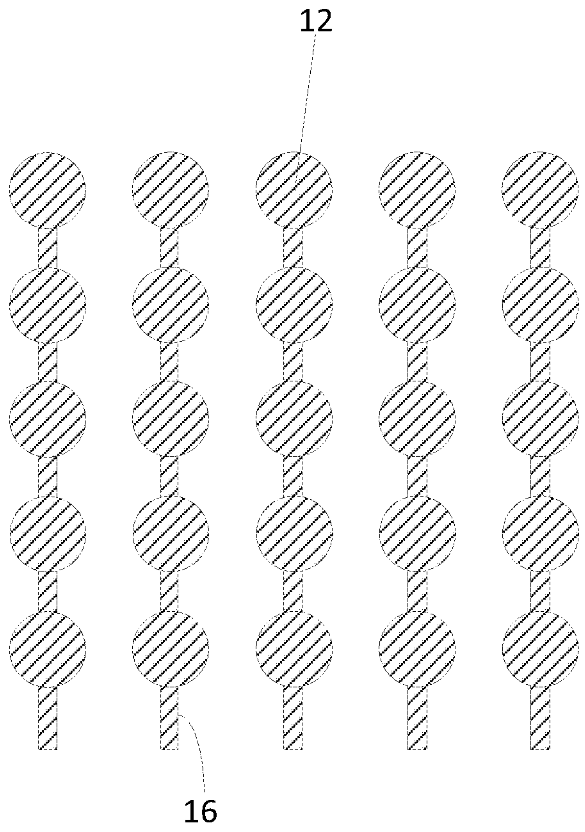
FIG. 14 is a schematic plan view of a bottom electrode.
Figure 15:
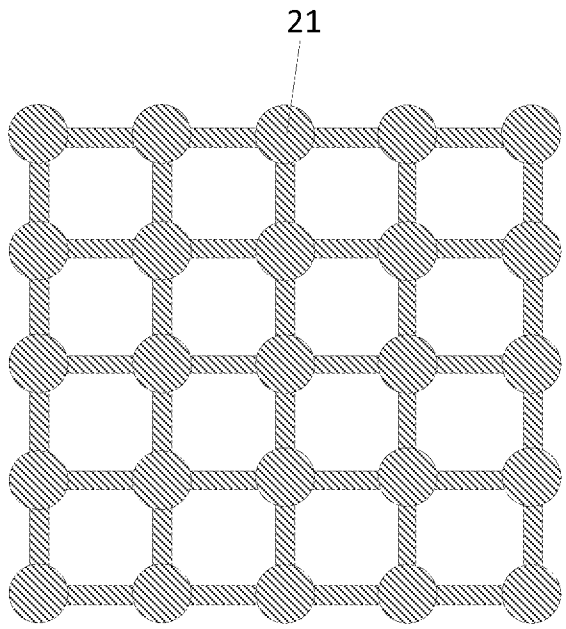
FIG. 15 is a schematic plan view of a top electrode.

In the above ultrasonic transducer provided by embodiments of the present disclosure, as shown in FIG. 13 to FIG. 15, FIG. 14 is a schematic plan view of a bottom electrode 12, FIG. 15 is a schematic plan view of a top electrode 21, the array substrate includes a device region AA and a surrounding region BB arranged surrounding the device region AA, a plurality of grooves 11 may be distributed in an array, the plurality of grooves 11 are located in the device region AA, the bottom electrodes 12 are in one-to-one correspondence with the grooves 11, and the top electrodes 21 are in one-to-one correspondence with the bottom electrodes 12.

Any two adjacent top electrodes 21 are mutually electrically connected.

The plurality of bottom electrodes 12 are divided into a plurality of regions (for example, one column is a region), any two adjacent bottom electrodes 12 in the same region are mutually electrically connected, and any two adjacent bottom electrodes 12 in different regions (for example, different columns) are mutually insulated. In this way, partition drive of the CMUT provided by the embodiment of the present disclosure may be implemented.

Figure 16:
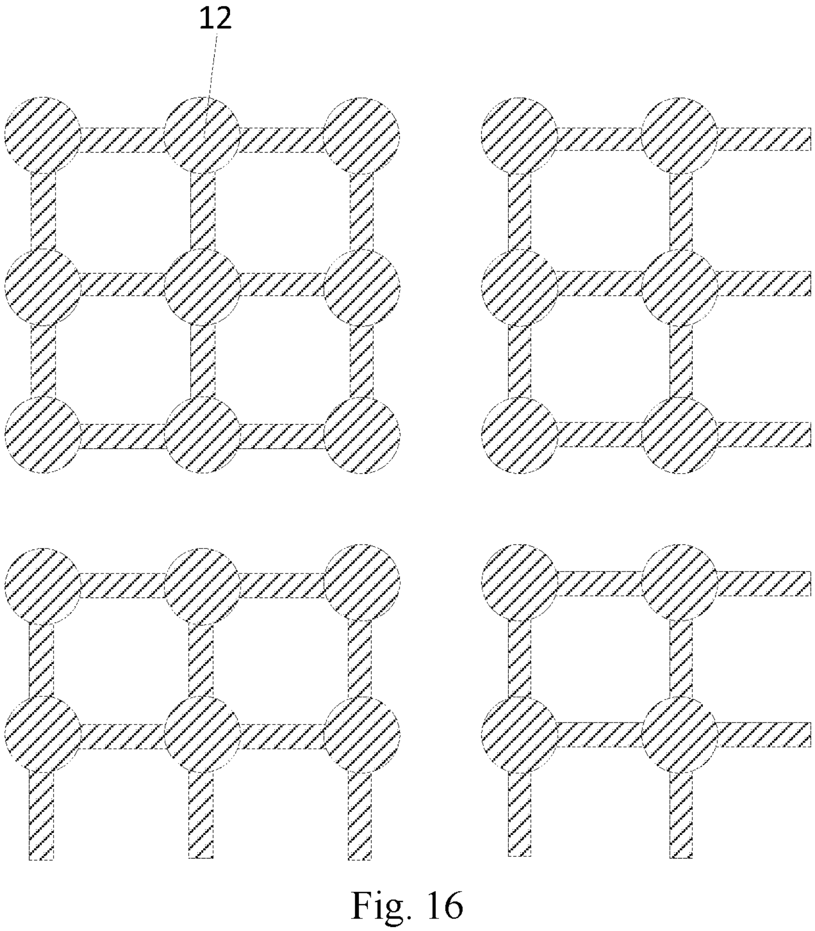
FIG. 16 is another schematic plan view of a bottom electrode.
Figure 17:
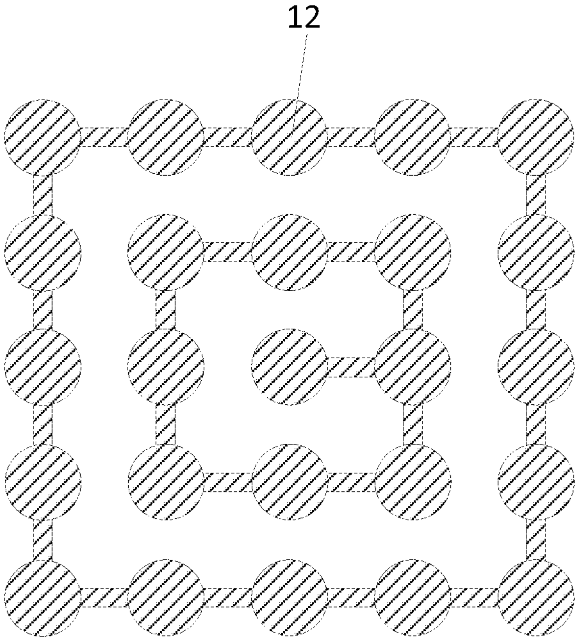
FIG. 17 is yet another schematic plan view of a bottom electrode.

During specific implementation, in the above ultrasonic transducer provided by the embodiment of the present disclosure, as shown in FIG. 14, all the bottom electrodes 12 located in the same column are mutually electrically connected, and the bottom electrodes 12 located in the different columns are mutually independent: as shown in FIG. 16, the plurality of bottom electrodes 12 are divided into a plurality of blocky regions, all the bottom electrodes 12 located in the same blocky region are mutually electrically connected, and the bottom electrodes 12 located in the different blocky regions are mutually independent; as shown FIG. 17, the plurality of bottom electrodes 12 are divided into a middle region and a peripheral region surrounding the middle region, all the bottom electrodes 12 in the middle region are mutually electrically connected, all the bottom electrodes 12 in the peripheral region are mutually electrically connected, and the bottom electrodes 12 in the middle region are independent of the bottom electrodes 12 in the peripheral region. Specifically, the embodiment of the present disclosure lists only three types of region dividing modes of the bottom electrodes 12. During specific implementation, region dividing design may be performed on the plurality of bottom electrodes 12 distributed in an array according to actual demands.

In the above ultrasonic transducer provided by embodiments of the present disclosure, as shown in FIG. 1 to FIG. 14, the array substrate 1 further includes first leads 16 electrically connected with the bottom electrodes 12.

As shown in FIG. 1 to FIG. 4, and FIG. 9 to FIG. 14, the first leads 16 are led out from side walls of the grooves 11 and extend to a first binding region B1 of the surrounding region BB. FIG. 1 to FIG. 4, and FIG. 9 to FIG. 12 illustrate only the first lead 16 in the first binding region B1, and all the bottom electrodes 12 are connected through a metal material located on the side walls of the grooves 11 and at a top of the base substrate 14.

As shown in FIG. 5 to FIG. 8, FIG. 13 and FIG. 14, in positions of the base substrate 14 corresponding to the bottom electrodes 12, the base substrate 14 has via holes penetrating through the base substrate 14 in a thickness direction of the base substrate 14, the first leads 16 are led out from the via holes and extend to the first binding region B1, and by filling the via holes with a metal material, all the bottom electrodes 12 are led to a back face of the base substrate 14 for connection.

Figure 18:
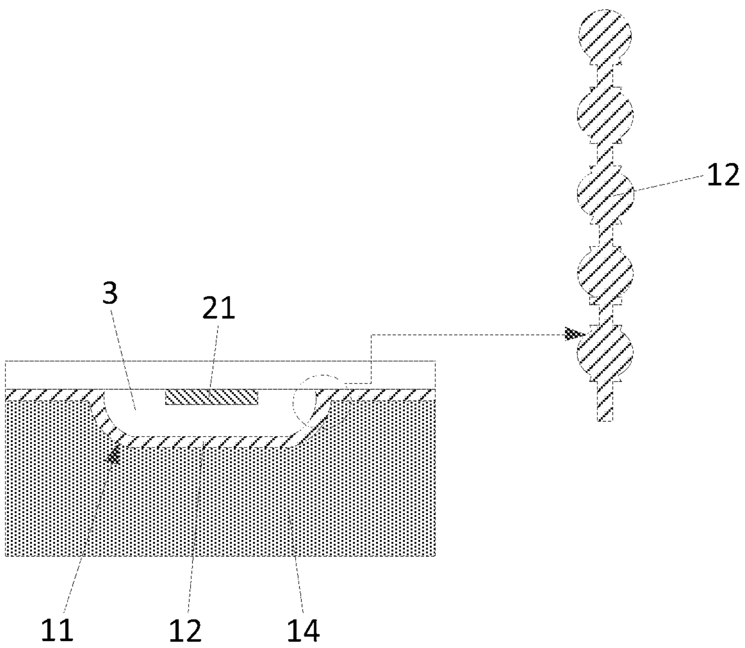
FIG. 18 is a schematic diagram of actual etching of a groove.

In the above ultrasonic transducer provided by embodiments of the present disclosure, as shown in FIG. 1 to FIG. 4, when the base substrate 14 is etched to form the groove, an etched shape of an ideal groove 11 and the formed cavity 3 are shown in FIG. 1 to FIG. 4, but undercutting may occur to the groove 11 during actual fabrication, as shown in FIG. 18. As shown in FIG. 14, FIG. 16 and FIG. 17, all the bottom electrodes 12 in the same region are mutually electrically connected, so a connection line 5 between every two adjacent bottom electrodes 12 needs to climb to a surface of the base substrate 14 along a side wall of the groove 11, a slope angle of a bottom of the cavity 3 is very small, the connection line 5 has no fabrication risk, a slope angle of a top of the cavity 3 is large, and the connection line 5 is prone to breaking, so the connection line 5 at an edge of the top of the cavity 3 needs to be subjected to widening processing, which is shown in a schematic diagram (a schematic enlarged view in a broken line frame on a left side) of connection of a column of bottom electrodes 12 on a right side in FIG. 18.

Figure 19:
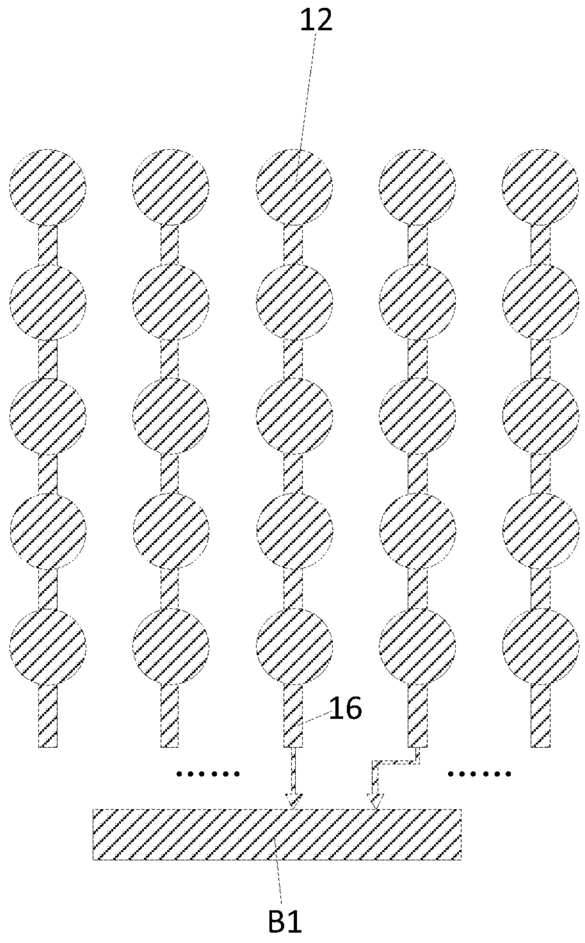
FIG. 19 is a schematic plan view of a film layer where a bottom electrode is located.
Figure 20:
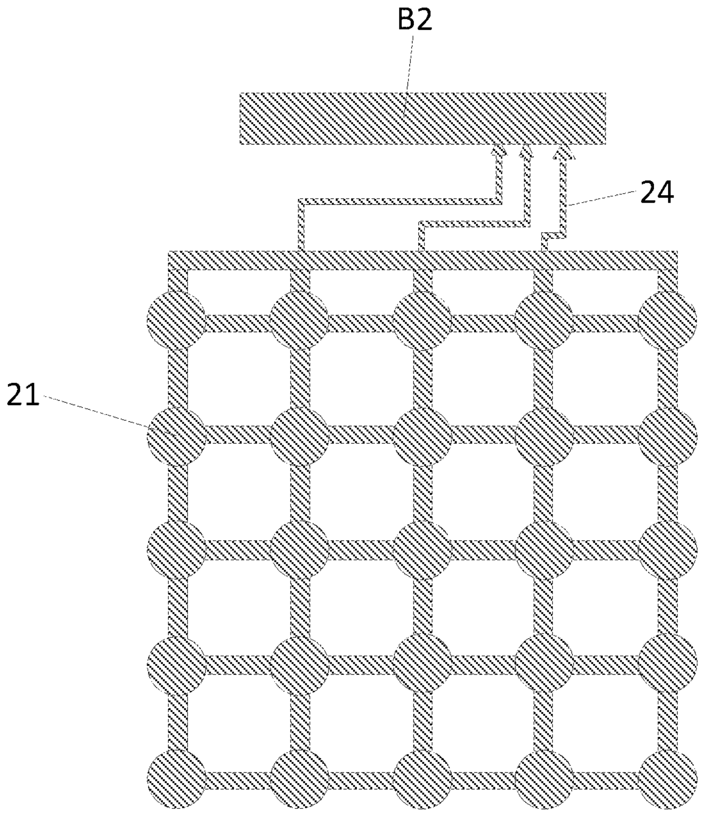
FIG. 20 is a schematic plan view of a film layer where a top electrode is located.
Figure 21:
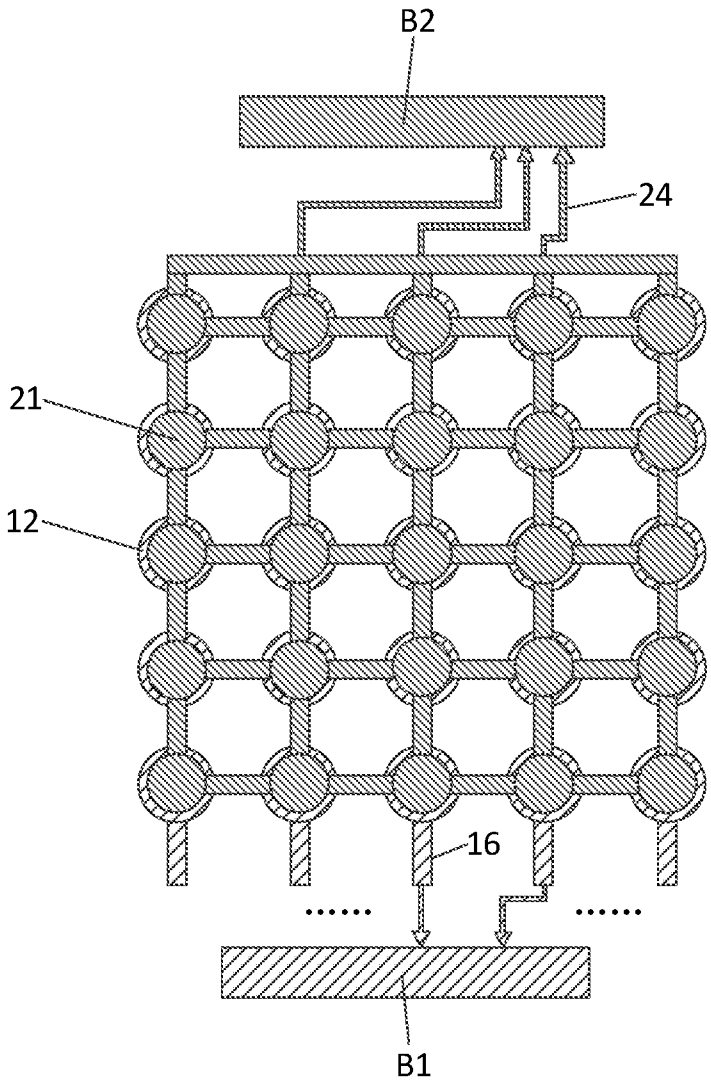
FIG. 21 is a schematic plan view of an overlaid film layer of FIG. 19 and FIG. 20.
Figure 22:
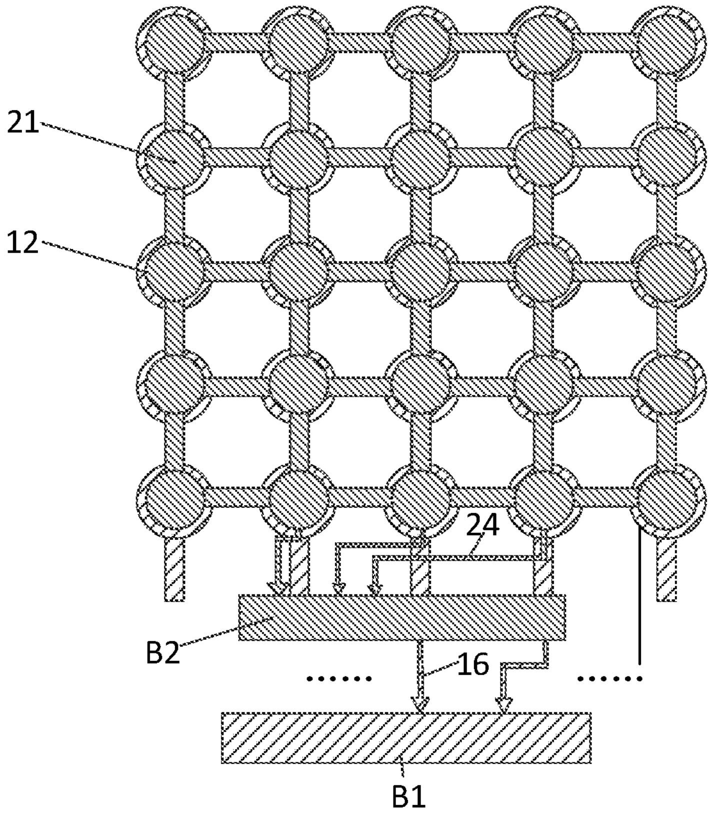
FIG. 22 is another schematic plan view of an overlaid film layer of FIG. 19 and FIG. 20.

In the above ultrasonic transducer provided by embodiments of the present disclosure, as shown in FIG. 19 to FIG. 22, FIG. 19 is a schematic plan view of a film layer where the bottom electrode 12 is located, FIG. 20 is a schematic plan view of a film layer where the top electrode 21 is located, FIG. 21 is a schematic plan view of an overlaid film layer of FIG. 19 and FIG. 20, FIG. 22 is another schematic plan view of an overlaid film layer of FIG. 19 and FIG. 20, the opposite substrate 2 includes third leads 24 electrically connected with the top electrodes 21, and the third leads 24 extend to a second binding region B2 of the opposite substrate 2.

As shown in FIG. 21, the first binding region B1 and the second binding region B2 may be located on opposite sides of the device region AA, so the top electrodes 21 and the bottom electrodes 12 may transmit signals respectively through circuit boards (for example, FPC) located in the binding regions of the corresponding substrates.

As shown in FIG. 22, the first binding region B1 and the second binding region B2 may be located on the same side of the device region AA, an orthographic projection of the second binding region B2 may be located between an orthographic projection of the device region AA and an orthographic projection of the first binding region AA, so the top electrodes 21 and the bottom electrodes 12 may transmit signals respectively through circuit boards (for example, FPC) located in the binding regions of the corresponding substrates.

Figure 23:
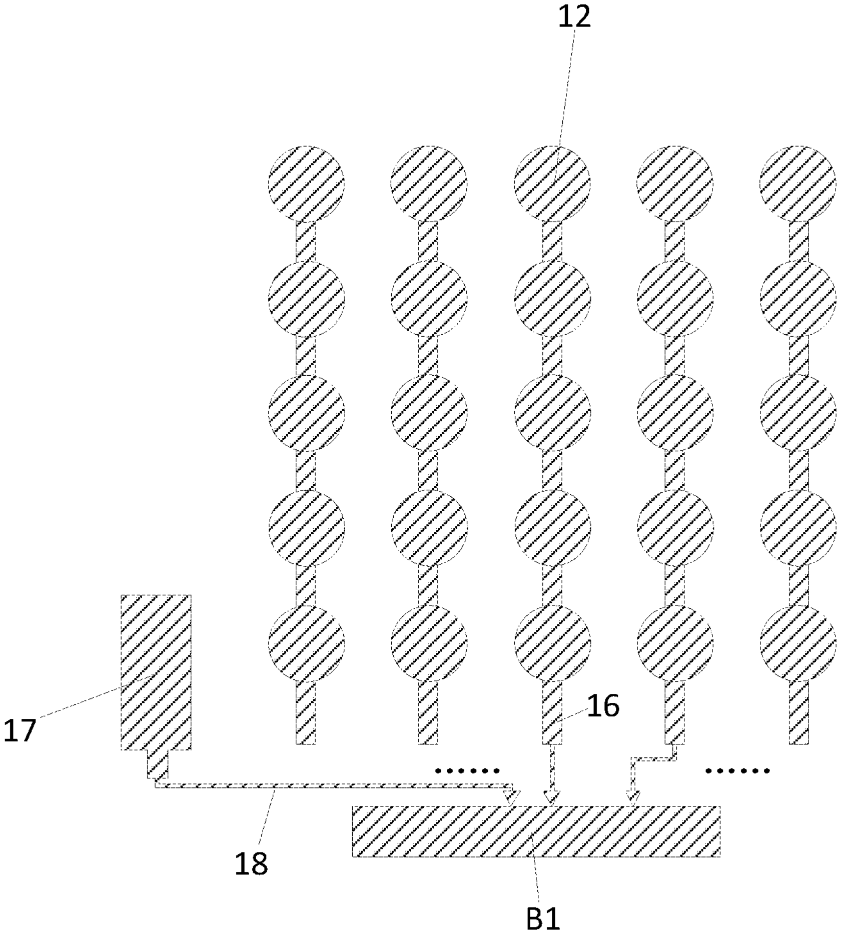
FIG. 23 is a schematic plan view of a film layer where a bottom electrode is located.
Figure 24:
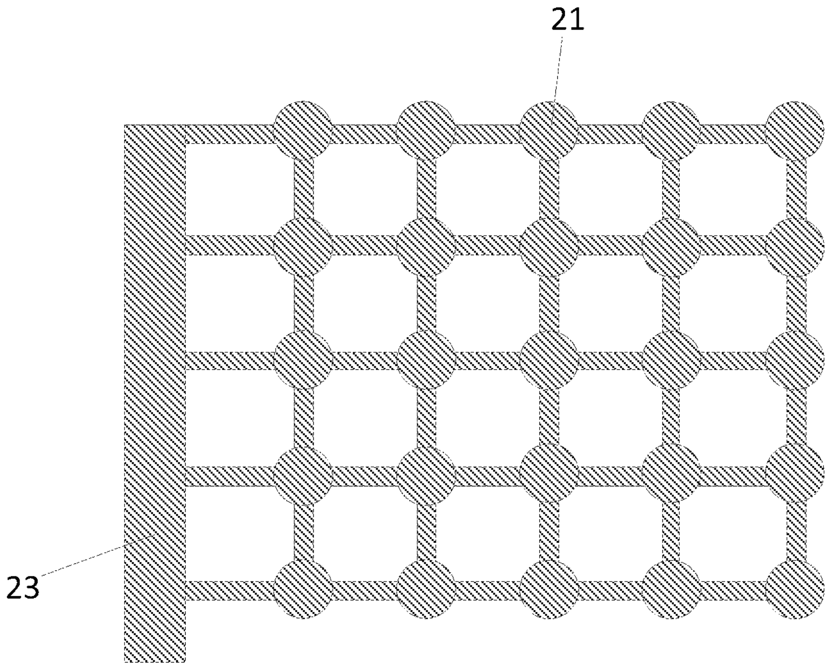
FIG. 24 is a schematic plan view of a film layer where a top electrode is located.
Figure 25:
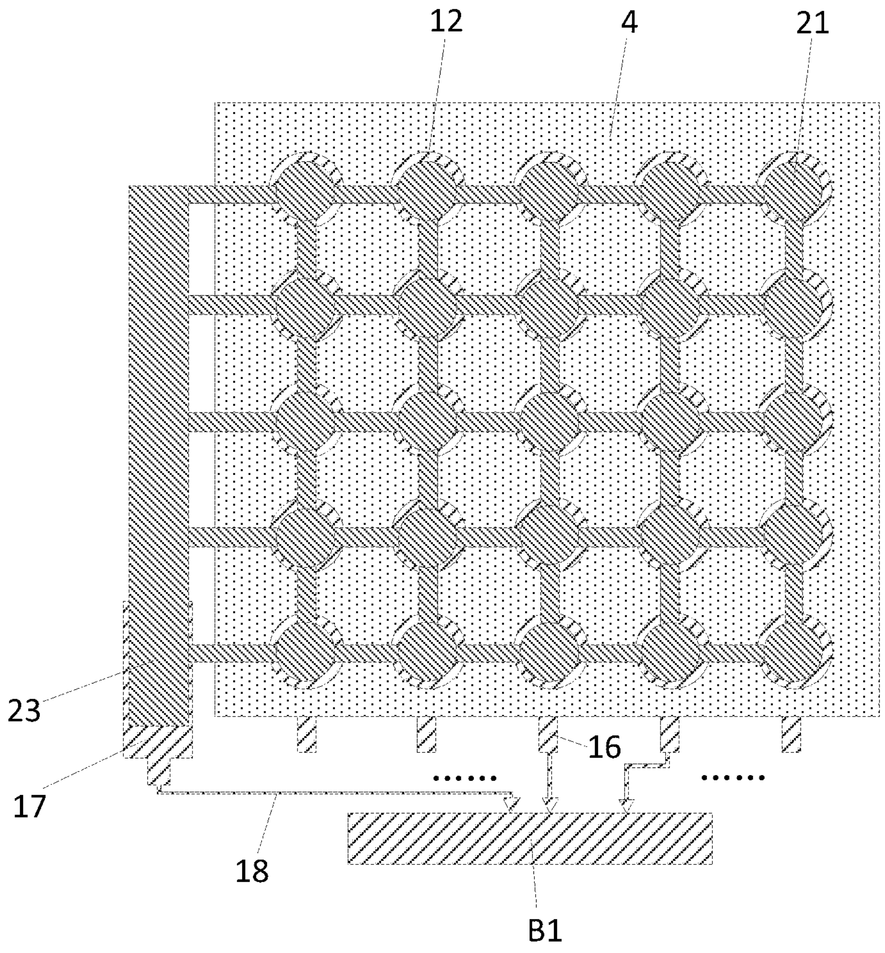
FIG. 25 is a schematic plan view of an overlaid film layer of FIG. 23 and FIG. 24.

In the above ultrasonic transducer provided by embodiments of the present disclosure, as shown in FIG. 23 to FIG. 25, FIG. 23 is a schematic plan view of a film layer where the bottom electrodes 12 are located, FIG. 24 is a schematic plan view of a film layer where the top electrodes 21 are located, FIG. 25 is a schematic plan view of an overlaid film layer of FIG. 23 and FIG. 24, the array substrate 1 further includes: a first connecting electrode 17 located in the surrounding region BB and arranged on the same layer as the bottom electrodes 12, and a second lead 18 electrically connected with the first connecting electrode 17, the opposite substrate 2 further includes a second connecting electrode 23 located in the surrounding region BB, arranged on the same layer as the top electrodes 21 and electrically connected with the top electrodes 21, the top electrodes 21 are electrically connected with the first connecting electrode 17 through the second connecting electrode 23, and the second lead 18 is led out and extends to the first binding region B1. In this way, the top electrodes 21 and the bottom electrodes 12 may transmit signals through the same circuit board (for example, FPC) located in the first binding region B1, and fabrication of one circuit board may be omitted.

During specific implementation, as shown in FIG. 23 to FIG. 25, a region for fabricating the first connecting electrode 17 is reserved on the film layer where the bottom electrodes 12 are located, a region for fabricating the second connecting electrode 23 is reserved on the film layer where the top electrodes 21 are located, and when the array substrate 1 and the opposite substrate 2 are aligned and attached, the top electrodes 21 are connected to the bottom electrodes 12 through signals by Ag dotting between the first connecting electrode 17 and the second connecting electrode 23.

Figure 26:
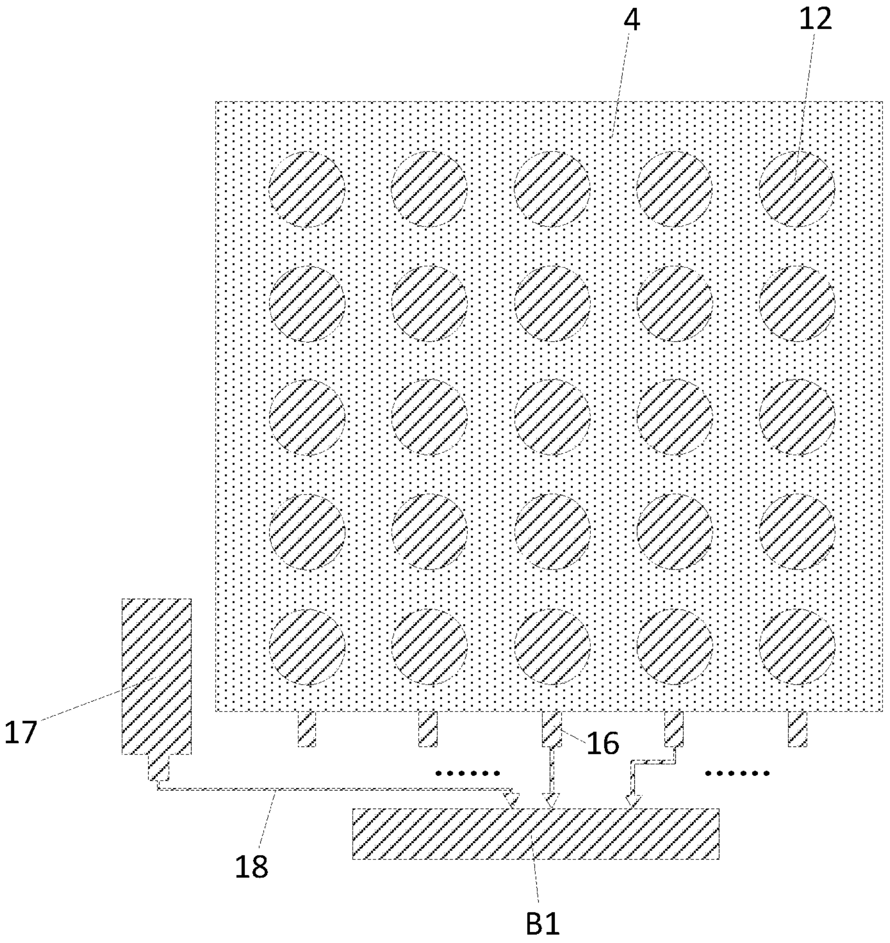
FIG. 26 is a schematic structural diagram of a first adhesive layer.
Figure 27:
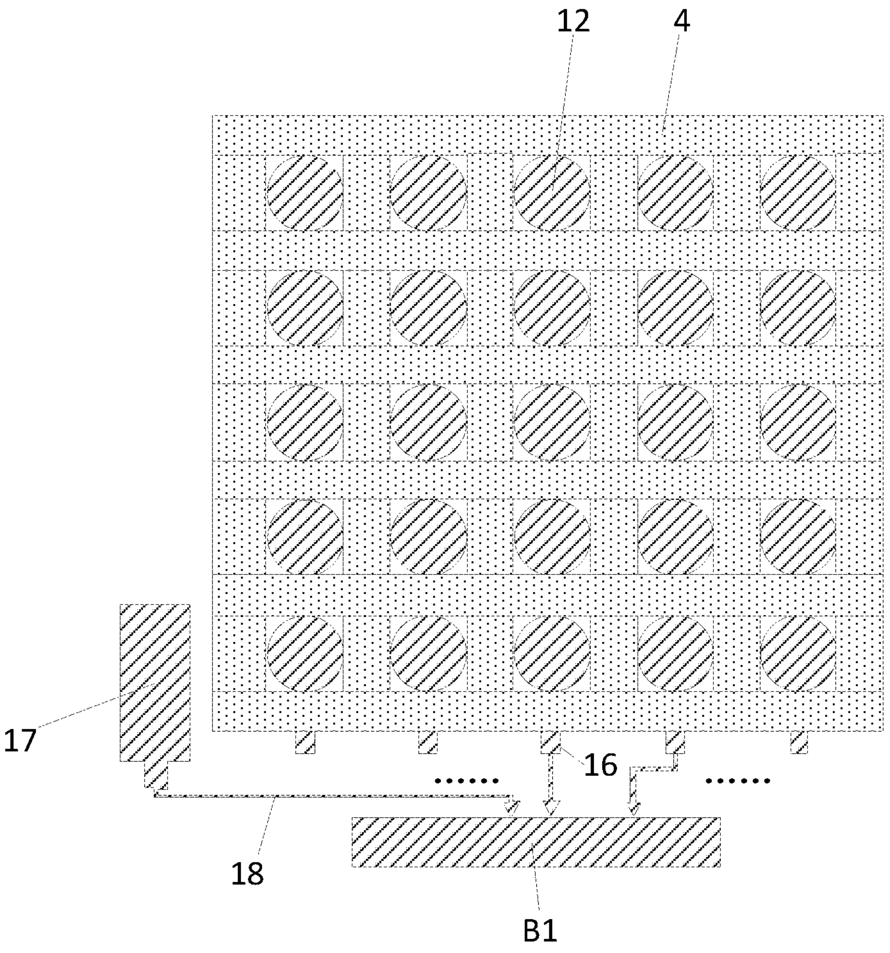
FIG. 27 is another schematic structural diagram of a first adhesive layer.

In the above ultrasonic transducer provided by embodiments of the present disclosure, as shown in FIG. 1, FIG. 2, FIG. 5, FIG. 6, FIG. 9 and FIG. 10, the first adhesive layer 4 may adopt a coater for mechanical coating of an adhesive, a pattern of the coated first adhesive layer 4 is located in a region beyond the bottom electrodes 12, as shown in FIG. 26 and FIG. 27, the adhesive may be divided into a non-photosensitive adhesive and a photosensitive adhesive, and during mechanical coating, adhesive applying may be performed around an outer edge of each groove 11 (FIG. 26), and may also be performed in a transverse and vertical crossing mode (FIG. 27).

By adopting the above CMUT provided by the embodiment of the present disclosure, directional sound production may be implemented through a parametric acoustic array technology. Regional sound production and sound production in different directions may be implemented by locally controlling array elements.

A CMUT acoustic sensor array emits directional audible sound demodulated by directional ultrasonic waves, that is, the audible sound is modulated onto an ultrasonic carrier to be emitted to the air, and highly directional audible sound is demodulated.

The parametric acoustic array technology is to make an audio signal be loaded to an ultrasonic wave after being subjected to signal processing and be emitted to the air through an ultrasonic sensor, two columns of ultrasonic waves of different frequencies have a nonlinear interaction in the air, and the audible sound (a beat frequency wave) is demodulated.

Figure 28:
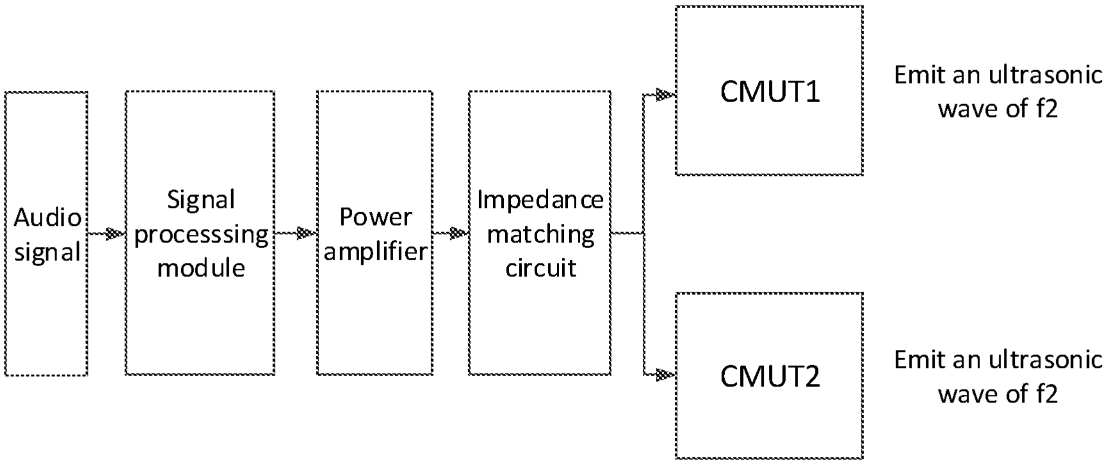
FIG. 28 is a schematic diagram of a parametric acoustic array system architecture.

As shown in FIG. 28, a parametric acoustic array system architecture includes: a signal processing module, a power amplifier, an impedance matching circuit, CMUTs (1 and 2) and the like. The audio signal is modulated into two ultrasonic waves (f1 and f2) through the signal processing module, and is transmitted to the CMUTs through the power amplifier and the impedance matching circuit, and the CMUTs emit ultrasonic waves of different frequencies. The nonlinear interaction occurs to the ultrasonic waves in air, and the audible sound is demodulated.

Figure 29:
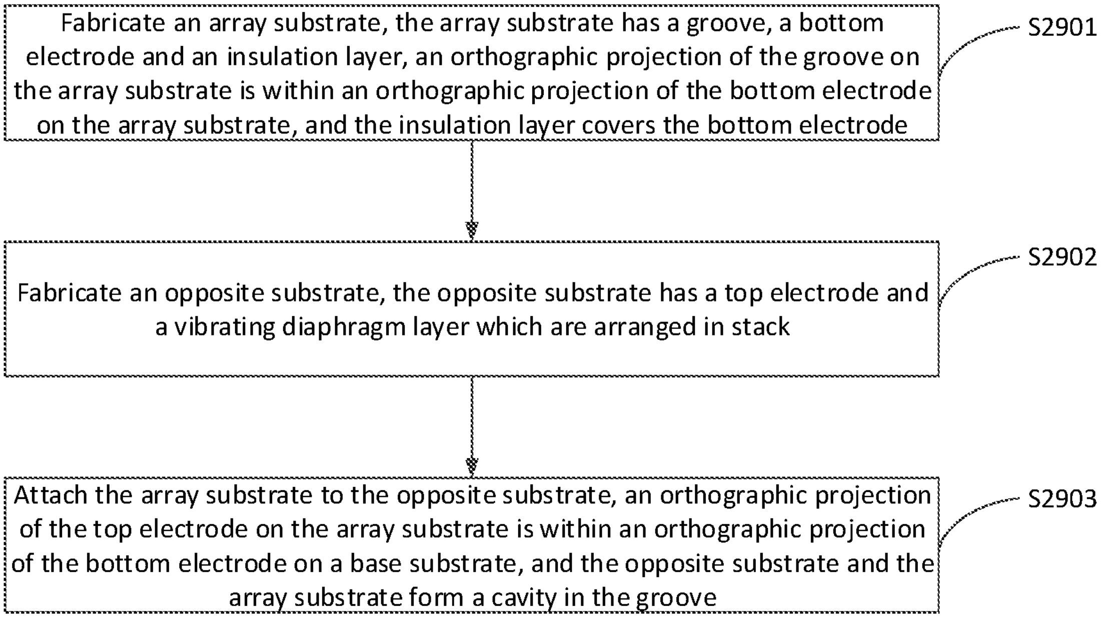
FIG. 29 is a schematic flow chart of a fabrication method of an ultrasonic transducer provided by an embodiment of the present disclosure.

Based on the same inventive concept, an embodiment of the present disclosure further provides a fabrication method of an ultrasonic transducer, as shown in FIG. 29, including: S2901, an array substrate is fabricated, wherein the array substrate has a groove, a bottom electrode and an insulation layer, wherein an orthographic projection of the groove on the array substrate is located within a range of an orthographic projection of the bottom electrode on the array substrate, and the insulation layer covers the bottom electrode; and S2902, an opposite substrate is fabricated, wherein the opposite substrate has a top electrode and a vibrating diaphragm layer which are arranged in stack; and S2903, the array substrate is attached to the opposite substrate, wherein an orthographic projection of the top electrode on the array substrate is located within a range of an orthographic projection of the bottom electrode on a base substrate, and the opposite substrate and the array substrate form a cavity in the groove.

Some embodiments of the present disclosure provide the fabrication method of the above ultrasonic transducer, the array substrate and the opposite substrate are fabricated respectively, and then the array substrate and the opposite substrate are aligned and attached, so that the CMUT of the embodiment of the present disclosure is formed. Compared with a sacrificial layer solution for fabricating the CMUT in the related art, the embodiment of the present disclosure provides a solution for fabricating the CMUT by separate fabrication and then attachment, which can meet design demands of applications of ultrasonic transducers in different frequency bands. Besides, the array substrate and the opposite substrate are fabricated respectively in the present disclosure, and a thickness of a vibrating diaphragm and a radius size of the cavity are conveniently adjusted, so as to meet different application demands. Besides, a process for fabricating the CMUT provided by the embodiment of the present disclosure is simple and high in productivity, meanwhile guarantees performance of the CMUT, and can greatly shorten time of forming the cavity of the CMUT, so as to improve preparation efficiency of the CMUT.

Figure 30A:
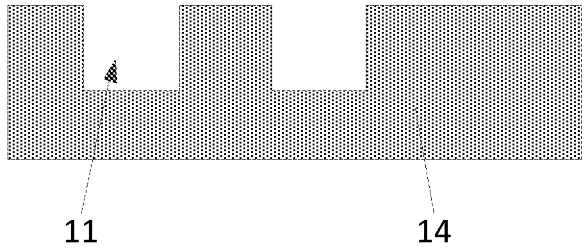
FIG. 30A is a schematic sectional view of the first fabricating step of an array substrate.
Figure 30B:
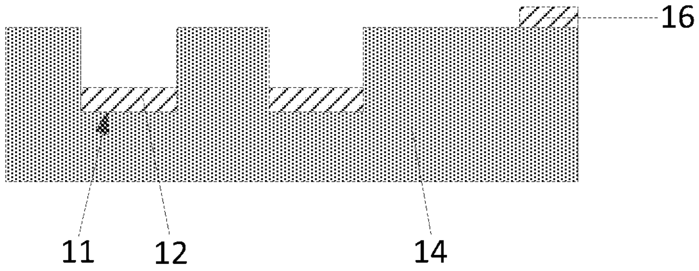
FIG. 30B is a schematic sectional view of the second fabricating step of an array substrate.
Figure 30C:
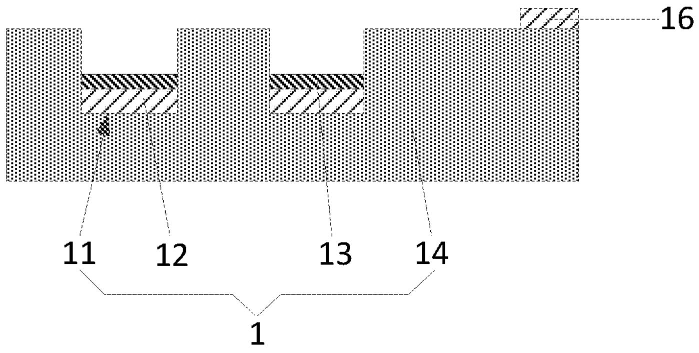
FIG. 30C is a schematic sectional view of the third fabricating step of an array substrate.

During specific implementation, in the above fabrication method provided by the embodiment of the present disclosure, the fabricating an array substrate of a structure shown in FIG. 1 to FIG. 4 may include:

- a base substrate 14 is provided and etched to form a groove 11, as shown in FIG. 30A, optionally, a metal hard mask may be fabricated on the base substrate 14, a first groove 11 with a demanded depth is etched by using a metal etching liquid (for example, a hydrofluoric acid), and then the hard mask is washed away; or a holing region of the base substrate 14 may also be irradiated with laser to be denatured, and then the first groove 11 is formed by etching;
- the bottom electrode 12 is formed at a bottom of the groove 11, as shown in FIG. 30B; and
- the insulation layer 13 is formed on a side of the bottom electrode 12 facing away from the bottom of the groove 11, as shown in FIG. 30C.

It needs to be noted that fabricating a structure shown in FIG. 5 to FIG. 8 is basically the same as fabricating the structure shown in FIG. 1 to FIG. 4, a difference lies in that while the groove 11 is fabricated, via holes penetrating through the base substrate 14 are formed, and when the bottom electrodes 12 are fabricated, all the bottom electrodes 12 are led out to a back face of the base substrate 14 to be electrically connected through the via holes filled with a metal material.

Figure 31A:
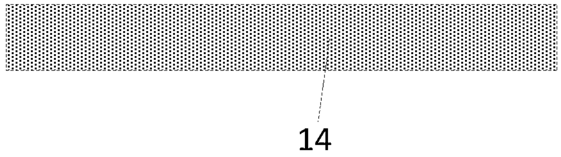
FIG. 31A is a schematic sectional views of the first fabricating step of another array substrate.
Figure 31B:
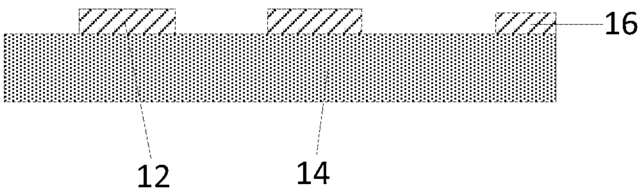
FIG. 31B is a schematic sectional views of the second fabricating step of another array substrate.
Figure 31C:
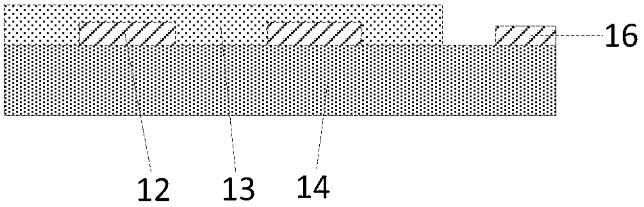
FIG. 31C is a schematic sectional views of the third fabricating step of another array substrate.
Figure 31D:
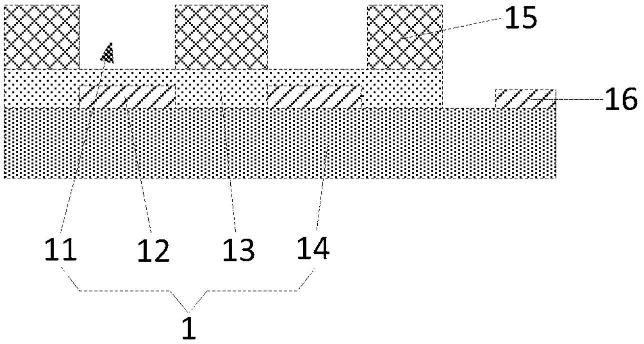
FIG. 31D is a schematic sectional views of the fourth fabricating step of another array substrate.

In the above fabrication method provided by embodiments of the present disclosure, the fabricating an array substrate of a structure shown in FIG. 9 to FIG. 12 may include:

- the base substrate 14 is provided, as shown in FIG. 31A;
- the bottom electrode 12 is formed on the base substrate 14, as shown in FIG. 31B;
- the insulation layer 13 is formed on a side of the bottom electrode 12 facing away from the base substrate 14, as shown in FIG. 31C; and
- the retaining wall structure 15 is formed on a side of the insulation layer 13 facing away from the base substrate 14, where the retaining wall structure 15 has the groove 11 which penetrates through the retaining wall structure 15 in a thickness direction of the retaining wall structure 15, as shown in FIG. 31D.

Figure 2:
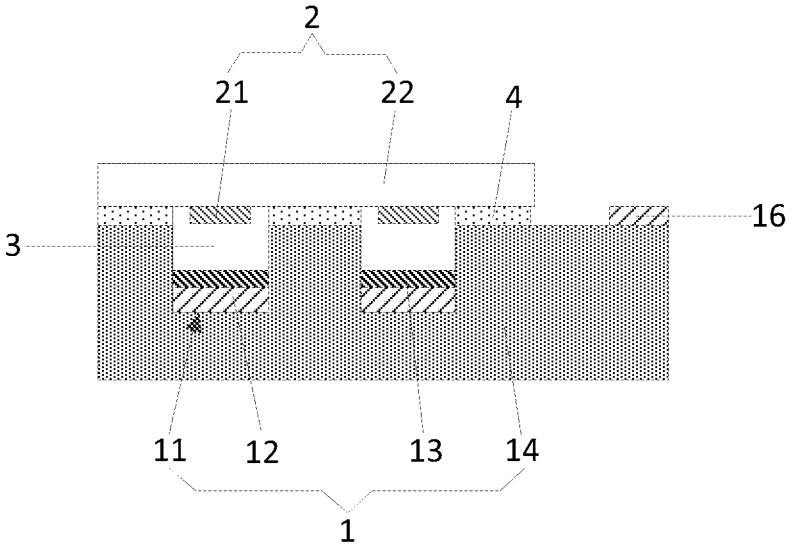
FIG. 2 is a schematic structural diagram of the second type of ultrasonic transducers provided by an embodiment of the present disclosure.
Figure 3:
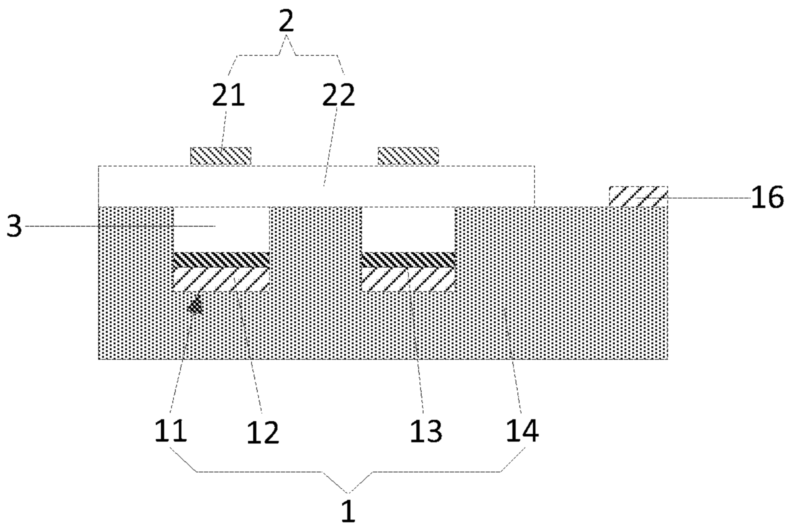
FIG. 3 is a schematic structural diagram of the third type of ultrasonic transducers provided by an embodiment of the present disclosure.
Figure 4:
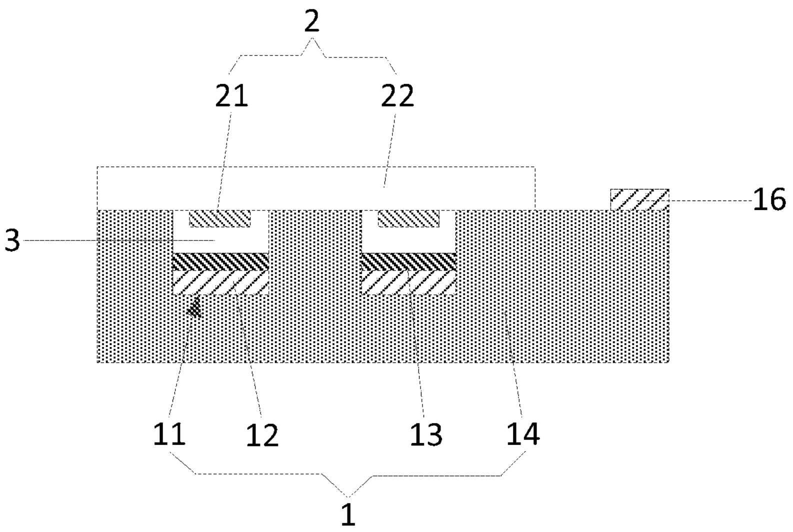
FIG. 4 is a schematic structural diagram of the fourth type of ultrasonic transducers provided by an embodiment of the present disclosure.
Figure 5:
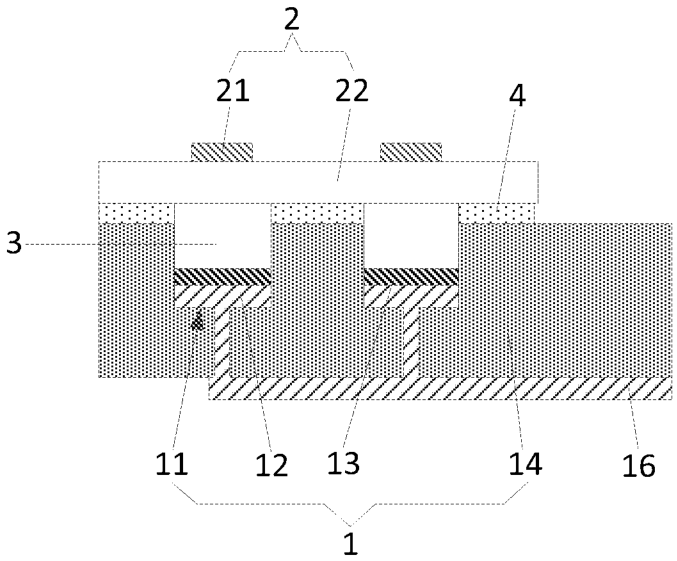
FIG. 5 is a schematic structural diagram of the fifth type of ultrasonic transducers provided by an embodiment of the present disclosure.
Figure 6:
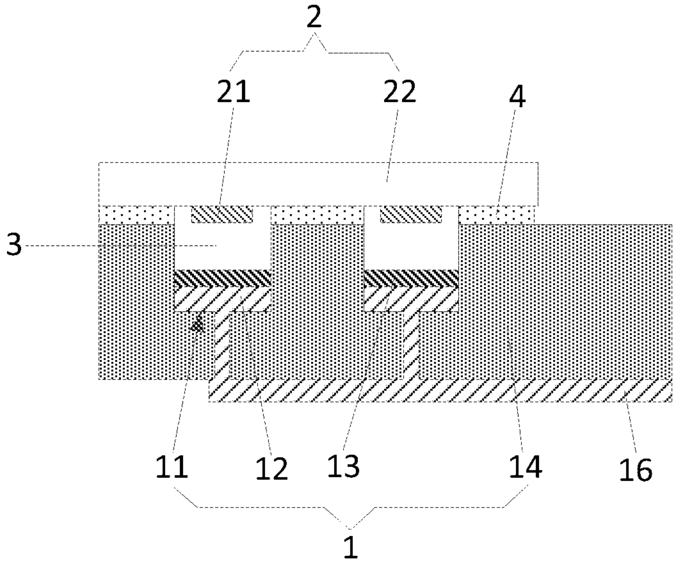
FIG. 6 is a schematic structural diagram of the sixth type of ultrasonic transducers provided by an embodiment of the present disclosure.
Figure 7:
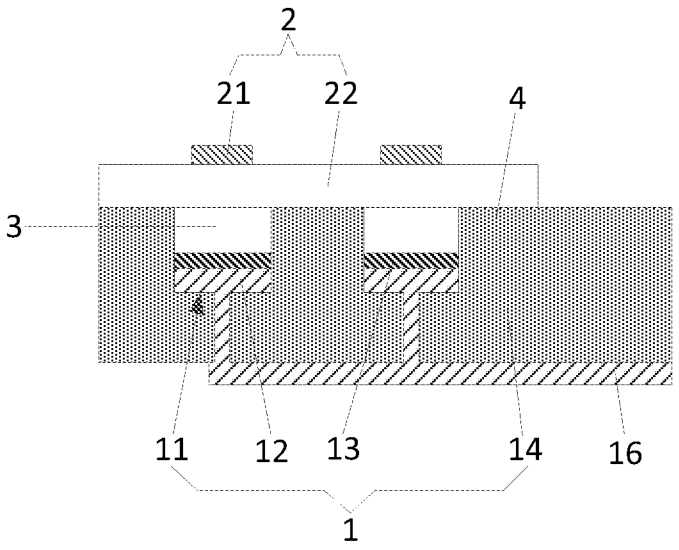
FIG. 7 is a schematic structural diagram of the seventh type of ultrasonic transducers provided by an embodiment of the present disclosure.
Figure 8:
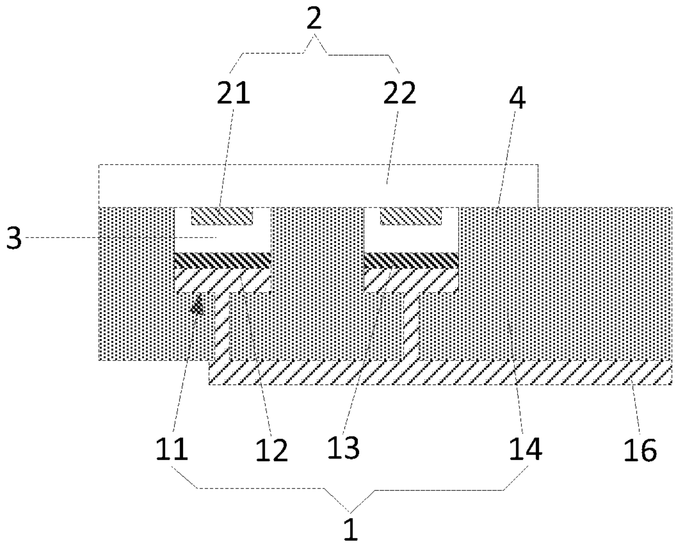
FIG. 8 is a schematic structural diagram of the eighth type of ultrasonic transducers provided by an embodiment of the present disclosure.
Figure 32A:
FIG. 32A is a schematic sectional view of the first fabricating step of an opposite substrate.
Figure 32B:
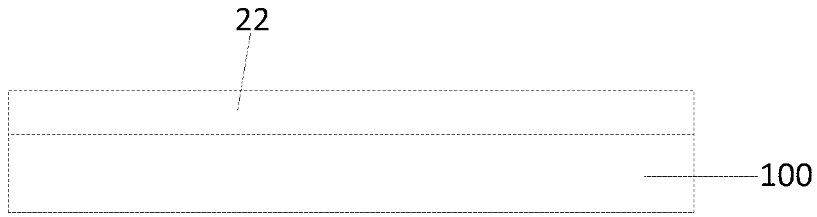
FIG. 32B is a schematic sectional view of the second fabricating step of an opposite substrate.
Figure 32C:
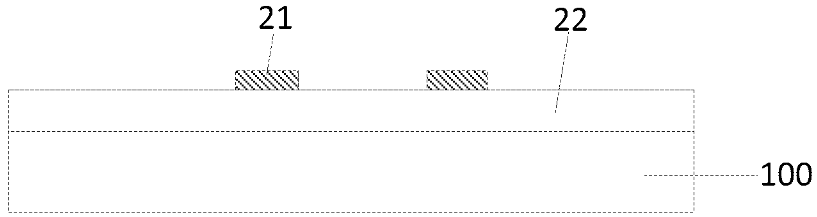
FIG. 32C is a schematic sectional view of the third fabricating step of an opposite substrate.

In the above fabrication method provided by the embodiment of the present disclosure, when a material of the vibrating diaphragm layer is PI or PET, taking a structure shown in FIG. 2 as an example, the fabricating an opposite substrate in the structure shown in FIG. 2 may include:

- a glass substrate 100 is provided, as shown in FIG. 32A;
- the vibrating diaphragm layer 22 is formed on the glass substrate 100, as shown in FIG. 32B, wherein a material of the vibrating diaphragm layer 22 may be PI or PET;
- the top electrode 21 is formed on the vibrating diaphragm layer 22, as shown in FIG. 32C; and
- the glass substrate 100 is stripped off before the array substrate 1 and the opposite substrate 2 shown in FIG. 30C are attached, or the glass substrate 100 is stripped off after the array substrate 1 and the opposite substrate 2 shown in FIG. 30C are attached, so as to form the opposite substrate 2.

Figure 32D:
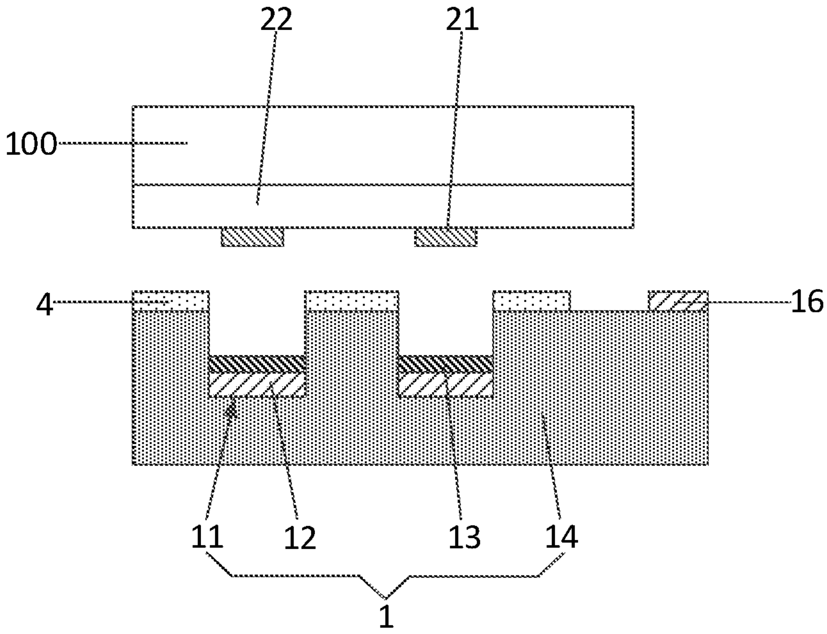
FIG. 32D is a schematic sectional view of the fourth fabricating step of an opposite substrate.

Optionally, taking the structure shown in FIG. 2 as an example, after fabrication of the array substrate 1 (FIG. 30C) is completed, the base substrate 14 of the array substrate 1 shown in FIG. 30C is coated with a first adhesive layer 4, and then a structure shown in FIG. 32C is turned over and then aligned with the array substrate 1 shown in FIG. 30C, as shown in FIG. 32D; successively, a structure shown in FIG. 32D is subjected to UV irradiation curing and bonding, as shown in FIG. 32E; and finally, the glass substrate 100 is stripped off (for example, in a laser lift-off mode), and the CMUT shown in FIG. 2 is formed.

Optionally, taking the structure shown in FIG. 2 as an example, after fabrication of the array substrate 1 (FIG. 30C) is completed, the base substrate 14 of the array substrate 1 shown in FIG. 30C is coated with the first adhesive layer 4, then the glass substrate 100 in the structure shown in FIG. 32C is stripped off (for example, in a laser lift-off mode), as shown in FIG. 32D'; then a structure shown in FIG. 32D' is turned over and then aligned with the array substrate 1 shown in FIG. 30C, as shown in FIG. 32E'; and successively, a structure shown in FIG. 32E' is subjected to UV irradiation curing and bonding, so as to form the CMUT shown in FIG. 2.

Optionally, the above fabrication process in FIG. 2 takes the material of the vibrating diaphragm layer being PI or PET as an example, if the material of the vibrating diaphragm layer is glass, the glass substrate is provided directly, the top electrode is fabricated on the glass substrate, and then the fabricated array substrate is attached to the glass substrate with the top electrode formed thereon. Specifically, the glass substrate with a demanded thickness may be directly adopted as the vibrating diaphragm layer; or after the glass substrate with a fixed thickness is attached, an antiacid film may be attached to the base substrate, the glass substrate with the fixed thickness is etched by using the hydrofluoric acid, etching time and a concentration of the hydrofluoric acid are controlled, and the vibrating diaphragm layer formed by thinning the glass substrate to a demanded thickness may be implemented.

Optionally, the above fabrication process in FIG. 2 takes the top electrode being located below the vibrating diaphragm layer as an example, when the top electrode is located above the vibrating diaphragm layer (for example, in FIG. 1), if the material of the vibrating diaphragm layer is glass, the top electrode may be fabricated on the vibrating diaphragm layer, then a surface of the vibrating diaphragm layer facing away from the top electrode is aligned and attached to the base substrate, or the top electrode may be fabricated on the vibrating diaphragm layer after the vibrating diaphragm layer and the array substrate are aligned and attached; and if the material of the vibrating diaphragm layer is PI or PET, the vibrating diaphragm layer may not need to be turned over after the glass substrate 100 is stripped off, and a surface of the vibrating diaphragm layer back on to the top electrode is directly aligned and attached to the base substrate.

Optionally, alignment and attachment in the above fabrication process in FIG. 2 take the first adhesive layer being adopted as an example, when the materials of the vibrating diaphragm layer and the base substrate are glass, the first adhesive layer may be not needed, and the vibrating diaphragm layer and the base substrate are attached by directly using a bonding mode.

Optionally, in the above fabrication process in FIG. 2, the groove 11 is directly etched in the base substrate 14, then the bottom electrode 12 and the insulation layer 13 are fabricated in the groove 11, and finally, alignment and attachment to the opposite substrate 2 are performed. When a structure shown in FIG. 9 is fabricated, if a material of the retaining wall structure 15 is glass, the glass substrate may be provided after fabrication of the insulation layer 13 of the array substrate 1 is completed, the glass substrate is etched to form the groove 11 penetrating through a thickness direction of the glass substrate, then the glass substrate with the groove 11 is attached to the insulation layer 13 of the array substrate 1, an finally, the opposite substrate 2 and the glass substrate 15 are aligned and attached through a first adhesive layer 4, so as to form the structure shown in FIG. 9.

Optionally, when the structure shown in FIG. 9 is fabricated, if the material of the retaining wall structure 15 is sealant or hydrogel, after fabrication of the array substrate 1 is completed, the insulation layer 13 of the array substrate 1 may be directly coated with the sealant or the hydrogel by using a coater, so as to form the retaining wall structure 15 defining the groove 11, and finally, the opposite substrate 2 and the retaining wall structure 15 are aligned and attached through a first adhesive layer 4, so as to form the structure shown in FIG. 9.

Optionally, when the structure shown in FIG. 9 is fabricated, if the material of the retaining wall structure 15 is resin, after fabrication of the array substrate 1 is completed, the whole insulation layer 13 of the array substrate 1 may be coated with a resin layer, the resin layer is subjected to exposure, developing and etching to form the groove 11 which penetrates through a thickness direction of the resin layer, so as to form the retaining wall structure 15, and finally, the opposite substrate 2 and the retaining wall structure 15 are aligned and attached through the first adhesive layer 4 so as to form the structure shown in FIG. 9.

It needs to be noted that the fabrication method and the alignment and attachment method shown in FIG. 3 to FIG. 8 and FIG. 10 to FIG. 12 are basically the same as the alignment and attachment method shown in FIG. 2 and FIG. 9, which may refer to FIG. 2 and FIG. 9) and specifically refer to the corresponding attachment method according to a structure of the CMUT and materials of related attached film layers.

It needs to be noted that when the CMUT provided by the embodiment of the present disclosure is fabricated, according to a binding mode of the top electrode and the bottom electrode, a corresponding connection electrode and a corresponding lead are fabricated on the corresponding film layers, so as to transmit signals in corresponding binding regions to the bottom electrode and the top electrode.

To sum up, the embodiment of the present disclosure provides the solution for fabricating the CMUT by separate fabrication and then attachment, and the thickness of the vibrating diaphragm and the radius size of the cavity are conveniently adjusted, so as to meet different application demands. The fabrication process is simple and high in productivity, meanwhile guarantees the performance of the CMUT, and can greatly shorten time of forming the cavity of the CMUT, so as to improve the preparation efficiency of the CMUT.

Based on the same inventive concept, an embodiment of the present disclosure further provides an electronic device, including the above ultrasonic transducer provided by the embodiment of the present disclosure. As a principle of solving problems of the electronic device is similar to that of the above ultrasonic transducer, implementation of the electronic device may refer to implementation of the above ultrasonic transducer, and repetitions are omitted. The electronic device may be: a mobile phone, a tablet computer, a television, a display, a notebook computer, a digital photo frame, a navigator and any product or component with a display or touch function.

During specific implementation, the above electronic device provided by embodiments of the present disclosure may further include other function structures well known to those skilled in the art, which is not detailed here.

Some embodiments of the present disclosure provide the ultrasonic transducer, the fabrication method thereof and the electronic device, the ultrasonic transducer (CMUT) includes the array substrate and the opposite substrate which are oppositely arranged and are attached to each other, so the array substrate and the opposite substrate may be fabricated respectively, and then the array substrate and the opposite substrate are aligned and attached, so as to form the CMUT of the embodiment of the present disclosure. Compared with the sacrificial layer solution for fabricating the CMUT in the related art, the embodiment of the present disclosure provides the solution for fabricating the CMUT by separate fabrication and then attachment, which can meet design demands of applications of ultrasonic transducers in different frequency bands. Besides, the array substrate and the opposite substrate are fabricated respectively in the present disclosure, and the thickness of the vibrating diaphragm and the radius size of the cavity are conveniently adjusted, so as to meet different application demands. Besides, the process for fabricating the CMUT provided by the embodiment of the present disclosure is simple and high in productivity, meanwhile guarantees the performance of the CMUT, and can greatly shorten time of forming the cavity of the CMUT, so as to improve the preparation efficiency of the CMUT.

Though the preferred embodiments of the present disclosure have been already described, those skilled in the art can make extra changes and modifications to these embodiments once they known a basic inventive concept. Therefore, the appended claims are intended to be constructed as including the preferred embodiments and all changes and modifications falling within the scope of the present disclosure.

Apparently, those skilled in the art can make various changes and variations to the embodiments of the present disclosure without departing from the spirit and the scope of the embodiments of the present disclosure. In this case, if these modifications and variations of the embodiments of the present disclosure fall within the scope of the claims of the present disclosure and their equivalents, the present disclosure also intends to contain these modifications and variations.

What is claimed is:

1. An ultrasonic transducer, comprising:

an array substrate comprising a groove, a bottom electrode and an insulation layer, wherein an orthographic projection of the groove on the array substrate is within an orthographic projection of the bottom electrode on the array substrate, and the insulation layer covers the bottom electrode; and an opposite substrate, wherein the opposite substrate and the array substrate are oppositely arranged and are attached to each other, the opposite substrate and the array substrate form a cavity in the groove, the opposite substrate comprises a top electrode and a vibrating diaphragm layer which are arranged in stack, and an orthographic projection of the top electrode on the array substrate is within the orthographic projection of the bottom electrode on the array substrate;

wherein the array substrate further comprises a base substrate, the base substrate comprises the groove, the bottom electrode is at a bottom of the groove, the insulation layer is on a side of the bottom electrode facing the opposite substrate, and a depth of the groove is greater than a sum of thicknesses of the bottom electrode and the insulation layer.

2. The ultrasonic transducer according to claim 1, wherein the top electrode is on a side facing away from the array substrate, of the vibrating diaphragm layer, or the top electrode is on a side facing the array substrate, of the vibrating diaphragm layer.

3. The ultrasonic transducer according to claim 2, wherein a material of the vibrating diaphragm layer is glass, Polyimide (PI), or Polyethylene Terephthalate (PET).

4. The ultrasonic transducer according to claim 1, wherein a material of the base substrate is glass.

5. The ultrasonic transducer according to claim 4, wherein a material of the vibrating diaphragm layer is PI or PET, and the vibrating diaphragm layer and the base substrate are fixedly attached through a first adhesive layer, or a material of the vibrating diaphragm layer is glass, the vibrating diaphragm layer and the base substrate are fixedly attached through a first adhesive layer, or the vibrating diaphragm layer and the base substrate are fixedly attached through a bonding technology.

6. The ultrasonic transducer according to claim 1, wherein a size of the top electrode is smaller than or equal to a size of the bottom electrode.

7. The ultrasonic transducer according to claim 1, wherein a shape of the groove comprises circle, square and polygon.

8. The ultrasonic transducer according to claim 1, wherein the array substrate comprises a device region and a surrounding region arranged surrounding the device region, a plurality of grooves are distributed in an array, the plurality of grooves are in the device region, the bottom electrodes are in one-to-one correspondence with the grooves, and the top electrodes are in one-to-one correspondence with the bottom electrodes, wherein any two adjacent top electrodes are mutually electrically connected; and the plurality of bottom electrodes are divided into a plurality of regions, any two adjacent bottom electrodes in a same region are mutually electrically connected, and any two adjacent bottom electrodes in different regions are mutually insulated.

9. The ultrasonic transducer according to claim 8, wherein all the bottom electrodes in the same column are mutually electrically connected, and the bottom electrodes in different columns are mutually independent; or, the plurality of bottom electrodes are divided into a plurality of blocky regions, all the bottom electrodes located in the same blocky region are mutually electrically connected, and the bottom electrodes located in the different blocky regions are mutually independent; or, the plurality of bottom electrodes are divided into a middle region and a peripheral region surrounding the middle region, all the bottom electrodes in the middle region are mutually electrically connected, all the bottom electrodes in the peripheral region are mutually electrically connected, and the bottom electrodes in the middle region are independent of the bottom electrodes in the peripheral region.

10. The ultrasonic transducer according to claim 9, wherein the array substrate further comprises first leads electrically connected with the bottom electrodes;

the first leads are led out from side walls of the grooves and extend to a first binding region of the surrounding region; or, in positions of the base substrate corresponding to the bottom electrodes, the base substrate has via holes penetrating through the base substrate in a thickness direction of the base substrate, and the first leads are led out from the via holes and extend to the first binding region.

11. The ultrasonic transducer according to claim 10, wherein the array substrate further comprises: a first connecting electrode in the surrounding region and arranged on a layer same as the layer where the bottom electrodes are, and a second lead electrically connected with the first connecting electrode; and the opposite substrate further comprises a second connecting electrode in the surrounding region, arranged on a layer as the top electrodes and electrically connected with the top electrodes, the top electrodes are electrically connected with the first connecting electrode through the second connecting electrode, and the second lead is led out and extends to the first binding region.

12. The ultrasonic transducer according to claim 10, wherein the opposite substrate comprises a third lead electrically connected with the top electrodes, and the third lead extends to a second binding region of the opposite substrate;

the first binding region and the second binding region are on opposite sides of the device region; or, the first binding region and the second binding region are on a same side of the device region, and an orthographic projection of the second binding region is between an orthographic projection of the device region and an orthographic projection of the first binding region.

13. An electronic device, comprising: the ultrasonic transducer according to claim 1.

14. An ultrasonic transducer, comprising:

an array substrate comprising a groove, a bottom electrode and an insulation layer, wherein an orthographic projection of the groove on the array substrate is within an orthographic projection of the bottom electrode on the array substrate, and the insulation layer covers the bottom electrode; and an opposite substrate, wherein the opposite substrate and the array substrate are oppositely arranged and are attached to each other, the opposite substrate and the array substrate form a cavity in the groove, the opposite substrate comprises a top electrode and a vibrating diaphragm layer which are arranged in stack, and an orthographic projection of the top electrode on the array substrate is within the orthographic projection of the bottom electrode on the array substrate;

wherein the array substrate further comprises: a base substrate, the bottom electrode located on the base substrate, the insulation layer located on a side facing away from the base substrate, of the bottom electrode, and a retaining wall structure located on a side facing away from the base substrate, of the insulation layer, wherein the retaining wall structure comprises the groove, and the groove penetrates through the retaining wall structure in a thickness direction of the retaining wall structure.

15. The ultrasonic transducer according to claim 14, wherein a material of the base substrate is glass, and a material of the retaining wall structure comprises one of glass, sealant, hydrogel or resin.

16. The ultrasonic transducer according to claim 15, wherein a material of the vibrating diaphragm layer is glass, the material of the retaining wall structure is glass, the vibrating diaphragm layer and the retaining wall structure are fixedly attached through a first adhesive layer, or the vibrating diaphragm layer and the retaining wall structure are fixedly attached through a bonding technology, or a material of the vibrating diaphragm layer is PI or PET, the material of the retaining wall structure is glass, sealant, hydrogel or resin, and the vibrating diaphragm layer and the retaining wall structure are fixedly attached through a first adhesive layer.

17. The ultrasonic transducer according to claim 14, wherein the array substrate comprises a device region and a surrounding region arranged surrounding the device region, a plurality of grooves are distributed in an array, the plurality of grooves are in the device region, the bottom electrodes are in one-to-one correspondence with the grooves, and the top electrodes are in one-to-one correspondence with the bottom electrodes, wherein any two adjacent top electrodes are mutually electrically connected; and the plurality of bottom electrodes are divided into a plurality of regions, any two adjacent bottom electrodes in a same region are mutually electrically connected, and any two adjacent bottom electrodes in different regions are mutually insulated.

18. A fabrication method of an ultrasonic transducer, wherein the ultrasonic transducer comprises: an array substrate comprising a groove, a bottom electrode and an insulation layer, wherein an orthographic projection of the groove on the array substrate is within an orthographic projection of the bottom electrode on the array substrate, and the insulation layer covers the bottom electrode; and an opposite substrate, wherein the opposite substrate and the array substrate are oppositely arranged and are attached to each other, the opposite substrate and the array substrate form a cavity in the groove, the opposite substrate comprises a top electrode and a vibrating diaphragm layer which are arranged in stack, and an orthographic projection of the top electrode on the array substrate is within the orthographic projection of the bottom electrode on the array substrate; wherein the array substrate further comprises a base substrate, the base substrate comprises the groove, the bottom electrode is at a bottom of the groove, the insulation layer is on a side of the bottom electrode facing the opposite substrate, and a depth of the groove is greater than a sum of thicknesses of the bottom electrode and the insulation layer; the fabrication method of the ultrasonic transducer comprises: fabricating the array substrate, wherein the array substrate comprises the groove, the bottom electrode and the insulation layer, the orthographic projection of the groove on the array substrate is within the orthographic projection of the bottom electrode on the array substrate, and the insulation layer covers the bottom electrode; fabricating the opposite substrate, wherein the opposite substrate comprises the top electrode and the vibrating diaphragm layer which are arranged in stack; and attaching the array substrate to the opposite substrate, wherein the orthographic projection of the top electrode on the array substrate is within the orthographic projection of the bottom electrode on the array substrate, and the opposite substrate and the array substrate form the cavity in the groove.

19. The fabrication method according to claim 18, wherein the fabricating an array substrate comprises: providing and etching a base substrate to form the groove; forming the bottom electrode at a bottom of the groove; and forming the insulation layer on a side facing away from the bottom of the groove, of the bottom electrode; or the fabricating an array substrate comprises: providing a base substrate; forming the bottom electrode on the base substrate; forming the insulation layer on a side facing away from the base substrate, of the bottom electrode; and forming a retaining wall structure on a side facing away from the base substrate, of the insulation layer, wherein the retaining wall structure comprises the groove which penetrates through the retaining wall structure in a thickness direction of the retaining wall structure.

20. The fabrication method according to claim 18, wherein the fabricating an opposite substrate comprises: providing a glass substrate; forming the vibrating diaphragm layer on the glass substrate, wherein a material of the vibrating diaphragm layer is PI or PET; forming the top electrode on the vibrating diaphragm layer; and stripping off the glass substrate before attaching the array substrate to the opposite substrate, or stripping off the glass substrate after attaching the array substrate to the opposite substrate.

* * * * *